(12) United States Patent
Sykes

(10) Patent No.: US 8,436,602 B2
(45) Date of Patent: May 7, 2013

(54) VOLTAGE COMPENSATION CIRCUIT

(75) Inventor: David L. Sykes, Pinellas Park, FL (US)

(73) Assignee: Technology Reasearch Corporation, Clearwater, FL (US)

( * ) Notice: Subject to any disclaimer, the term of this patent is extended or adjusted under 35 U.S.C. 154(b) by 885 days.

(21) Appl. No.: 12/583,132

(22) Filed: Aug. 14, 2009

(65) Prior Publication Data

US 2010/0039090 A1    Feb. 18, 2010

Related U.S. Application Data

(60) Provisional application No. 61/189,170, filed on Aug. 15, 2008.

(51) Int. Cl.
*G05F 5/00*    (2006.01)
(52) U.S. Cl.
USPC ............................................ 323/301; 323/258

(58) Field of Classification Search .................. 323/301, 323/255, 257, 258, 340, 343, 345, 356, 359
See application file for complete search history.

(56) References Cited

U.S. PATENT DOCUMENTS

| | | | | |
|---|---|---|---|---|
| 5,808,454 | A | * | 9/1998 | Chung .......................... 323/255 |
| 6,087,818 | A | * | 7/2000 | Hughes ........................ 323/301 |
| 6,417,651 | B1 | * | 7/2002 | Kronberg ...................... 323/255 |

* cited by examiner

*Primary Examiner* — Harry Behm
*Assistant Examiner* — Matthew Grubb
(74) *Attorney, Agent, or Firm* — Frijouf, Rust & Pyle P.A

(57) ABSTRACT

A voltage compensation circuit is disclosed for proving an elevated output AC voltage upon an under voltage input AC voltage condition. The voltage compensation circuit comprises an autotransformer having a first and a second autotransformer winding. A first position of a switch connects the first autotransformer winding to the input AC voltage for providing an elevated output AC voltage at the second autotransformer winding. The second position of the switch shorting the first autotransformer winding for providing a non-elevated output AC voltage.

11 Claims, 15 Drawing Sheets

VOLTAGE COMPENSATION CIRCUIT

CROSS-REFERENCE TO RELATED APPLICATIONS

This application claims benefit of U.S. Patent Provisional application No. 61/189,170 filed Aug. 15, 2008. All subject matter set forth in provisional application 61/189,170 filed Aug. 15, 2008 is hereby incorporated by reference into the present application as if fully set forth herein.

BACKGROUND OF THE INVENTION

1. Field of the Invention

This invention relates to electrical power circuit and more particularly to a voltage compensation circuit for proving an elevated output AC voltage upon an undervolt input AC voltage condition.

2. Description of the Related Art

It is well known in the art that many electrical devices may be damaged by a low voltage alternating current AC power input. Among the electrical devices that are most sensitive to a low voltage input include electric motors that power various devices such as an air conditioning compressor.

Various devices have been proposed by the prior art to compensate for a low voltage alternating current AC power source. The following United States patents and patent applications a representative of the efforts of the prior art to provide an electrical device for compensating for a low voltage alternating current power source.

U.S. Pat. No. 2,063,693 to McCarty discloses an alternating current circuit comprising a transformer having a plurality of windings including a series winding in said alternating current circuit and an exciting winding. A negative current characteristic impedance is connected across one of the windings of said transformer other than said series winding. A circuit controller selectively connects said exciting winding across said alternating current circuit and disconnecting it.

U.S. Pat. No. 4,131,927 to Tsuchiya, et al. discloses a circuit for preventing a current surge normally associated with the initial application of a nominal A.C. current to an inductive load. The surge is prevented by preventing the magnetic core of the inductive load from being driven into saturation. Initially, the current is half wave rectified and amplitude limited. The amplitude limitation insures that the core will not be driven into saturation. A voltage detector connected across the inductive load senses only the counter E.M.F. of a polarity opposite to the polarity of the half wave current. When the sensed voltage reaches a predetermined value, a direct connection is provided between the A.C. supply and the inductive load, bypassing the half wave rectifier and the amplitude limiter.

U.S. Pat. No. 4,716,357 to Cooper discloses an apparatus for AC line voltage regulation has an input port for connection to an AC source, an output port for connection to a load, and a transformer assembly connected between the input and output ports. The transformer assembly comprises a buck/boost winding and a primary winding wound about a common transformer core, and a switch arrangement for controlling the connection of the primary winding in circuit with the buck/boost winding. Switch actuators control switches responsive to a voltage sensor assembly to connect the primary winding in either of two possible conditions when the voltage is outside predetermined limits. The transformer assembly comprises either a step down transformer for reducing or bucking the output voltage or a step up transformer for compensation the output voltage according to the condition of the switch arrangement. The primary may comprise separate windings controlled by the switching assembly for connection in different configurations.

U.S. Pat. No. 4,853,608 to Schrade discloses an AC voltage regulator includes a transformer arrangement having a plurality of taps so that an input line voltage is passed to an output line with the output line voltage being determined by the nominal value of the input line voltage together with an amount contributed by the transformer. A network of relays switch the device that act as a polarity reversal switch so that the voltage generated by the transformer is either added or subtracted to the nominal voltage. Further relays used in two series control the selection of the transformer tap. A transient suppression circuit uses a triac and resistor to communicate current from the input line to the output line with the triac gated into conduction on breaking of a relay contact. A comparator measures the input line voltage using a plurality of op-amps in series with the outputs passing through a logic circuit to control the relays.

U.S. Pat. No. 4,897,522 to Bilczo et al. discloses a control circuit is provided for the output of a high frequency inverter of the type having an output transformer with a core, primary windings and a secondary winding with two sections for creating a first secondary current pulse of electrical current in one section when the primary windings magnetizes the core and a second secondary current pulse in the other of the secondary sections when the primary windings remagnetizes the core. By alternating switch means for passing current through the primaries to magnetize and remagnetize the core at a preselected rate the output current pulses are provided by the two sections of secondary windings. The control circuit of the present invention involves a modification of the output transformer secondary stage. A first auxiliary winding is connected to one of the secondary sections to create an auxiliary current pulse as the core of the transformer is magnetized. A means is then employed for limiting this auxiliary current pulse and for adding the limited auxiliary current pulse to the first secondary pulse created by the secondary section to which the auxiliary winding is connected. In a like manner, a second auxiliary winding is connected to the other of the secondary sections to create a second auxiliary current pulse as the core is remagnetized. Means are provided for limiting the second auxiliary current pulse and for adding the second auxiliary current pulse to the second secondary current pulse from the secondary winding. Addition of limited current pulses to secondary current pulses created by the inverter provides a maximum output voltage that is higher than the maximum output voltage normally available while conserving primary current under higher output current conditions.

U.S. Pat. No. 5,450,305 to Boys et al. discloses a resonant power supply produces a varying magnetic field from a resonant inductor. Two active switches drive, but remain outside, a resonant circuit, also including resonant capacitor. A phase-splitting transformer provides, via a decoupling inductor, one connection for a power supply; the return is through the active switches, which are either off or are from time to time driven alternately by the controller so as to maintain the resonant current in the resonant circuit. Applications include induction heating and induction hobs for cooking, and also a power source for inductively powered vehicles (or other inductively powered devices) adjacent to an inductive pathway.

U.S. Pat. No. 5,461,300 to Kappenman discloses a dynamic phase angle regulator for enhancing the transient stability of a three-phase AC power system includes a controller, a switching assembly of thyristor switches, and a single transformer coupled to a power line. The transformer includes a balanced three-phase configuration of exciting windings coupled to nodes at each phase of a three-phase transmission system. Each phase of the transformer further includes a pair of regulating windings electrically coupled to the node and magnetically coupled to a corresponding exciting winding. Each exciting winding induces a voltage on the corresponding pair of regulating windings. To provide a selected phase shift, the controller actuates the switching assembly in response to a transient event to add a voltage induced on the regulating windings to the line voltage. A method is also provided for regulating the phase angle in a polyphase power transmission system.

U.S. Pat. No. 5,581,173 to Yalla et al. discloses a micro controller based tap-changer controller including apparatus for keeping track of an electrically closed tap position and for automatically changing the tap setting of load tap-changing transformers and regulators; the tap-changer controller further utilizes the "keep-track" tap position to calculate the source voltage of the regulator for reverse power operations; and, a method for paralleling tap-changing transformers and regulators utilizing the circulating current of the units.

U.S. Pat. No. 5,712,554 to Lace discloses a voltage compensation device for a two-conductor A.C. power line supplying one or more air conditioners, a telephone system or other telecommunication system, or some other utilization system that requires an input voltage within a given range. The device includes a transformer having electromagnetically coupled primary and secondary windings with the primary and secondary each connected to at least one output terminal. One winding is connected to add voltage to the A.C. line voltage when the line voltage drops below a given low voltage threshold, and in bucking (subtractive) relation when the A.C. line voltage exceeds a given high voltage threshold. When the A.C. line voltage is in the range required by the utilization system, the one winding is effectively shorted out or otherwise disconnected. A sensor for the line voltage actuates one or more relays connected to the transformer to effect the desired compensation action. The voltage compensation device may handle either under-voltage conditions or over-voltage conditions, or both. In one embodiment the one winding is split to afford two levels of voltage compensation both for under-voltage and over-voltage conditions.

U.S. Pat. No. 5,883,503 to Lace discloses a voltage compensation system for an A.C. power line supplying one or more air conditioners, a telephone system or other telecommunication system, a battery charger, or some other utilization system that should have an input voltage within a given normal range. The voltage compensation system includes a transformer unit containing a transformer having at least two windings coupled electromagnetically by a transformer core; one of those windings preferably is in two segments that are connectable in series or in parallel. One winding is connected to an input terminal and to an output terminal. The other winding adds to the A.C. line voltage when the line voltage drops below a low voltage threshold and/or subtracts from the line voltage when the A.C. line voltage exceeds a high voltage threshold. If the A.C. line voltage is in the range required by the utilization system, the other transformer winding is effectively shorted out or otherwise disconnected. In automated versions, a line voltage sensor actuates a switching circuit to effect the desired compensation action. The voltage compensation system may handle under-voltage conditions, over-voltage conditions, or both. For chronic under-voltage or over-voltage conditions, direct winding connections may be employed instead of relays.

U.S. Pat. No. 5,990,667 to Degeneff et al. discloses a regulator is provided for establishing asymmetrical voltage increase/decrease capability between an input node and an output node for enhanced regulation of either voltage sag or voltage swell within a utility system. The regulator includes an autotransformer having an input tap coupled to the input node of the regulator and an output tap coupled to the output node. The regulator further includes an electronic tap changer system coupled to the winding of the autotransformer. Together, the autotransformer and the electronic tap changer system provide the regulator with its asymmetrical voltage increase/decrease capability between the input node and the output node thereof. The regulator can be configured for voltage increase only, voltage decrease only, or both, provided an asymmetrical voltage increase/decrease capability.

U.S. Pat. No. 6,087,818 to Hughes discloses a voltage booster device for increasing the voltage level of power received by a recreational vehicle (RV) from a separate 120-volt power source includes an electrical box, a power cord and female outlet on the box, and an encapsulated transformer within the box. The transformer (e.g., an autotransformer) is adapted to increase the actual voltage level of the separate 120-volt power source a predetermined amount. A relay is provided for switching the transformer, the power cord, and the female outlet between (i) a first circuit configuration that couples power from the power cord to the female outlet via the transformer so that the transformer increases the voltage level by the predetermined amount, and (ii) a second circuit configuration that bypasses the transformer so that the transformer does not increase the voltage level by the predetermined amount. A control circuit controls the relay so that (i) the relay switches to the first circuit configuration when the actual voltage of the separate 120-volt power source falls below a predetermined first threshold level, and (ii) the relay switches to the second circuit configuration when the actual voltage rises above a predetermined second threshold level. One embodiment includes a mounting plate with a rounded end that functions as a handle, and a case hardened steel loop that receives a security chain.

U.S. Pat. No. 6,100,673 to Bair, III et al. discloses a voltage control apparatus (10) selectively boosts or bucks an input voltage in order to provide a selected output voltage. In the preferred embodiment, the apparatus includes a transformer (T1) having a plurality of secondary voltages presented at respective output connections (A-E), a connection circuit (12) having actuatable connection elements (R1-R6) to interconnect selected ones of the output connections, and a control circuit (14) operable to sense the input voltage at the primary of the transformer (T1) and to activate selected ones of the connection elements to produce a selected output voltage for delivery to a load. The preferred connection elements include electromechanical relays.

U.S. Pat. No. 6,137,277 to Rajda et al. discloses a static voltage regulator consists of a booster transformer, a regulator transformer, an electronic switching system and a control system. The booster transformer includes a booster primary winding and a booster secondary winding. The booster secondary is provided in series with the input and output terminals of the regulator so as to produce an output voltage. The regulator transformer includes a regulator primary winding and a regulator secondary winding. The regulator primary is electrically coupled to the output. The electronic switching system is coupled between the regulator secondary and the booster primary for providing a voltage to the booster primary. The control system includes a voltage sensor for sensing a voltage at the input, and a gating system coupled to the switching system for switching the output voltage in response to changes in the sensed input voltage. The voltage regulator also includes a notch filter coupled to the booster transformer for reducing transients induced in the booster transformer when the output voltage is switched.

U.S. Pat. No. 6,538,909 to Goodarzi et al discloses a universal power converter for generating a regulated voltage, current or power with a large input voltage range. The power converter has a voltage boost function configured to boost the rectified input voltage and provide power factor correction. The power converter also includes a voltage chop function to chop the boosted voltage to form an AC voltage. The power converter further includes at least one relay in electrical communication with the AC voltage and a transformer. The primary winding has at least two inputs operative to selectively vary the voltage generated on a secondary winding thereof selected by the relay. Accordingly, the power converter can generate different voltages at the output based upon the position of the relay and the boosted voltage. The power converter provides maximum power operation at a wide output voltage range, maximizing the charging energy.

U.S. Pat. No. 7,177,168 to Toyomura et al. discloses an AC module makers must prepare two types of AC modules for the 100-V and 200-V outputs only for domestic supply. For foreign countries, the makers must manufacture AC modules compatible with more system voltages. To solve these problems, the control circuit of an AC module controls the operation of an inverter circuit and/or the transformation ratio of a transforming circuit, and ON/OFF-controls a switch on the basis of the system voltage and connection state of an electric power system.

U.S. Patent application 2002/0044468 to Goodarzi et al. discloses universal power converter for generating a regulated voltage, current or power with a large input voltage range. The power converter has a voltage boost function configured to boost the rectified input voltage and provide power factor correction. The power converter also includes a voltage chop function to chop the boosted voltage to form an AC voltage. The power converter further includes at least one relay in electrical communication with the AC voltage and a transformer. The primary winding has at least two inputs operative to selectively vary the voltage generated on a secondary winding thereof selected by the relay. Accordingly, the power converter can generate different voltages at the output based upon the position of the relay and the boosted voltage. The power converter provides maximum power operation at a wide output voltage range, maximizing the charging energy.

U.S. Patent application 2002/0044473 to Toyomura et al. discloses a control circuit of an AC module having an inverter circuit and/or the transformation ratio of a transforming circuit for switching between domestic supply voltages and for foreign supply voltages.

U.S. Patent application 2004/0151011 to Toyomura et al. discloses a control circuit of an AC module having an inverter circuit and/or the transformation ratio of a transforming circuit for switching between domestic supply voltages and for foreign supply voltages.

U.S. Patent application 2008/0012626 to Kimura et al. discloses a booster circuit comprising an input terminal; an output terminal; a common terminal; a transformation unit including first, the second, and the third windings, the windings wound in the same direction and connected in series. A first rectifier unit is provided between the input terminal and a connection point of the first and the second windings; a second rectifier unit provided between the input terminal and a connection point of the second and the third windings. A first switching unit is provided between one end of the transformation unit and the common terminal. A second switching unit is provided between other end of the transformation unit and the common terminal. A third rectifier unit is provided between a connection point of one end of the transformation unit and the first switching element and the output terminal. A fourth rectifier unit is provided between a connection point of other end of the transformation unit and the second switching element and the output terminal. The first winding and the third winding have the approximately same number of turns and the first switching element and the second switching element open and close alternately to each other in response to a pair of control signals. Thereby, it is possible to provide a booster circuit that is capable of generating an output voltage, which is more than twice as high as an input voltage, and can be reduced in the size and the weight.

Although the aforementioned discloses have contributed to the art, it is an object of the present invention to provide a voltage compensation circuit that provides a further significant improvement in the electrical art.

Another object of this invention is to provide a voltage compensation circuit that incorporates an autotransformer for providing an elevated output AC voltage output upon an under voltage input AC voltage.

Another object of this invention is to provide a voltage compensation circuit that is applicable to a wide variety of voltage compensation uses.

Another object of this invention is to provide a voltage compensation circuit that is lighter and more cost effective than the voltage compensation circuit of the prior art.

Another object of this invention is to provide a voltage compensation circuit that requires a reduced number of electrical components.

Another object of this invention is to provide a voltage compensation circuit incorporating an arc suppression circuit.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention and the detailed description describing the preferred embodiment of the invention.

SUMMARY OF THE INVENTION

A specific embodiment of the present invention is shown in the attached drawings. For the purpose of summarizing the invention, the invention comprises a voltage compensation circuit for receiving an input AC voltage at a first and a second input terminal and for providing an elevated output AC voltage at a first and a second output terminal upon an under voltage condition at the input AC voltage. A voltage compensation circuit for receiving an input AC voltage at a first and a second input terminal and for proving an elevated output AC voltage at a first and a second output terminal upon an under voltage condition at the input AC voltage. The voltage compensation circuit comprises an autotransformer having a first and a second autotransformer winding defined by an autotransformer tap. A first input connector connects the first input terminal to the first output terminal. A second input connector connects the second input terminal to the autotransformer tap. An autotransformer output connector connects the second autotransformer winding to the second output terminal. A switch has a first and a second position. A first position of the switch connects the first autotransformer winding to the first and second input terminals for providing an elevated output AC voltage at the first and second output terminals. A second position of the switch shorts the first autotransformer winding for providing a non-elevated output AC voltage at the first and second output terminals.

In a more specific embodiment of the invention, the first autotransformer winding has a majority of winding whereas the second autotransformer winding has a minority of windings.

In a more specific embodiment of the invention, the first position of the switch connects the first transformer winding as a primary winding and the second transformer winding as a secondary winding. The second position of the switch connects the second transformer winding as a primary winding and the first transformer winding as a shorted secondary winding. The first autotransformer winding has a greater number of windings than the second autotransformer winding. The first and second autotransformer windings have a ratio proportional to a desired elevated output AC voltage at the first and second output terminals. Preferably, the second autotransformer winding has a greater winding thickness than the second autotransformer winding. The first and second autotransformer windings have a ratio of thickness proportional to a ratio of the number of the first and the second autotransformer windings.

In another specific embodiment of the invention, the voltage compensation circuit includes a control for operating the switch in accordance with the input AC voltage between the first and second input terminals. Preferably, the control has a comparator for comparing the input AC voltage to a voltage reference. The switch comprises an electrically operated mechanical relay or a solid state relay for electrically switching between the first position and the second position in accordance with an output from the comparator. In one example, the control has a ground sensing circuit for sensing a proper grounding of the input AC voltage.

In another example, the invention is incorporated into a voltage compensation circuit for receiving an input AC voltage at a first and a second input terminal and for providing an elevated output AC voltage at a first and a second output terminal in the event of an under voltage condition of the input AC voltage. The voltage compensation circuit comprises an autotransformer having a first, second and a third transformer tap with the second transformer tap located between the second and third transformer taps. A first autotransformer winding is defined between the first transformer tap and the second transformer tap of the autotransformer. A second autotransformer winding is defined between the second transformer tap and the third transformer tap of the autotransformer. A first input connector connects the first input terminal to the first output terminal of the autotransformer. A second input connector connects the second input terminal to the second transformer tap of the autotransformer. An autotransformer output connector connects the third transformer tap of the autotransformer to the second output terminal. A switch is connected to the first transformer tap of the autotransformer. A first position of the switch connects the first transformer tap of the autotransformer to the first input connector to provide an elevated output AC voltage between the first and second output terminals. A second position of the switch connect the first transformer tap of the autotransformer to the second input connector for shorting the first autotransformer winding to provide a non-elevated output AC voltage between the first and second output terminal. The shorted first autotransformer winding provides a zero reflected impedance to the second autotransformer winding for providing a non-elevated output AC voltage at the first and second output terminal.

The foregoing has outlined rather broadly the more pertinent and important features of the present invention in order that the detailed description that follows may be better understood so that the present contribution to the art can be more fully appreciated. Additional features of the invention will be described hereinafter which form the subject matter of the invention. It should be appreciated by those skilled in the art that the conception and the specific embodiments disclosed maybe readily utilized as a basis for modifying or designing other structures for carrying out the same purposes of the present invention. It should also be realized by those skilled in the art that such equivalent constructions do not depart from the spirit and scope of the invention.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
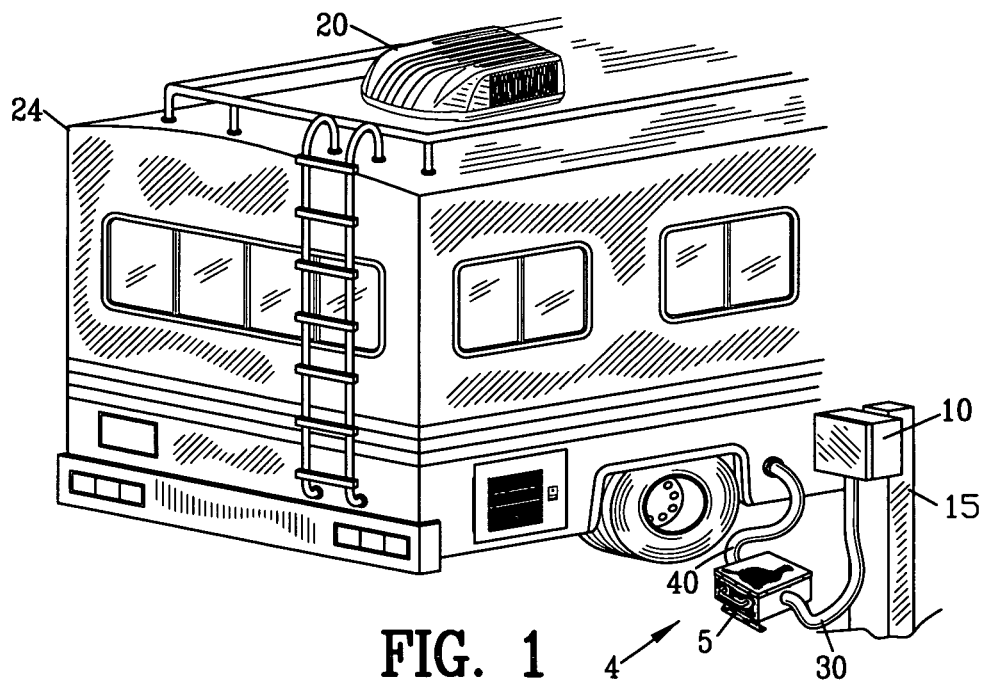
FIG. 1 is an elevational view of the voltage compensation device of the present invention connected between a power source and a load shown as a recreational vehicle.

FIG. 1 is an elevational view of the voltage compensation device 4 of the present invention comprising a voltage compensation circuit 5 connected between an AC voltage source 10 and a load 20. In this example, the AC voltage source 10 is shown as a conventional 120-volt alternating current source mounted on a pedestal 15. Although the AC voltage source 10 is shown as a conventional 120-volt AC voltage source, it should be understood that the AC voltage source 10 maybe any type of AC voltage source such one leg of a three phase electrical system and the like. The load 20 is shown as an air conditioning unit of a recreational vehicle 24. However, it should be understood that the load 20 maybe any type of AC load or a combination of AC loads.

Figure 2:
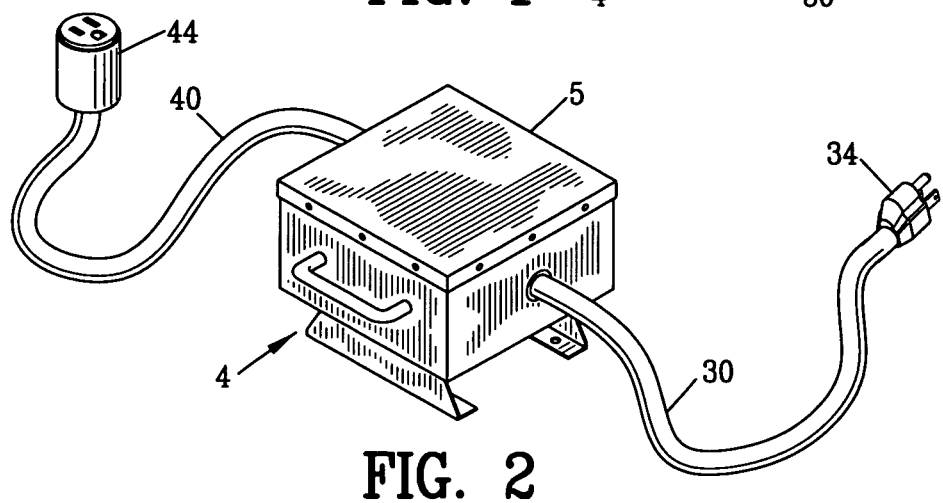
FIG. 2 is an enlarged view of the voltage compensation device shown in FIG. 1.

FIG. 2 is an enlarged view of the voltage compensation device 4 shown in FIG. 1. The voltage compensation device 4 comprises an input cable 30 having an input plug 34 for connection to the AC voltage source 10. The voltage compensation device 4 provides an output AC through an output cable 40 to an output socket 44.

Figure 3:
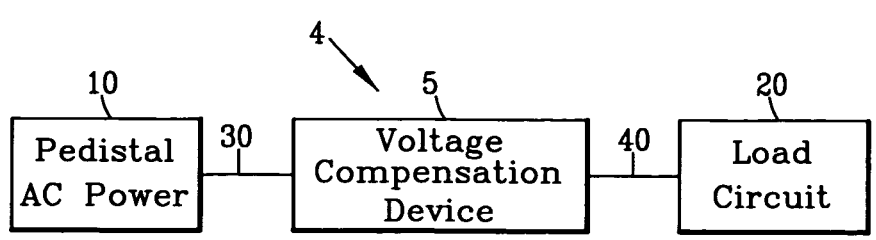
FIG. 3 a block connection diagram of the voltage compensation device shown in FIG. 2

FIG. 3 a block connection diagram of the voltage compensation device 4 shown in FIG. 2. The voltage compensation device 4 receives an input AC voltage at the input cable 30 from the power source 10. The voltage compensation device 4 provides an elevated output AC voltage at the output cable 40 to the load 20 upon an under voltage condition at the input AC voltage source 10. The voltage compensation device 4 provides a non-elevated output AC voltage at the output cable 40 to the load 20 upon a normal voltage condition at the input AC voltage source 10.

Figure 4:
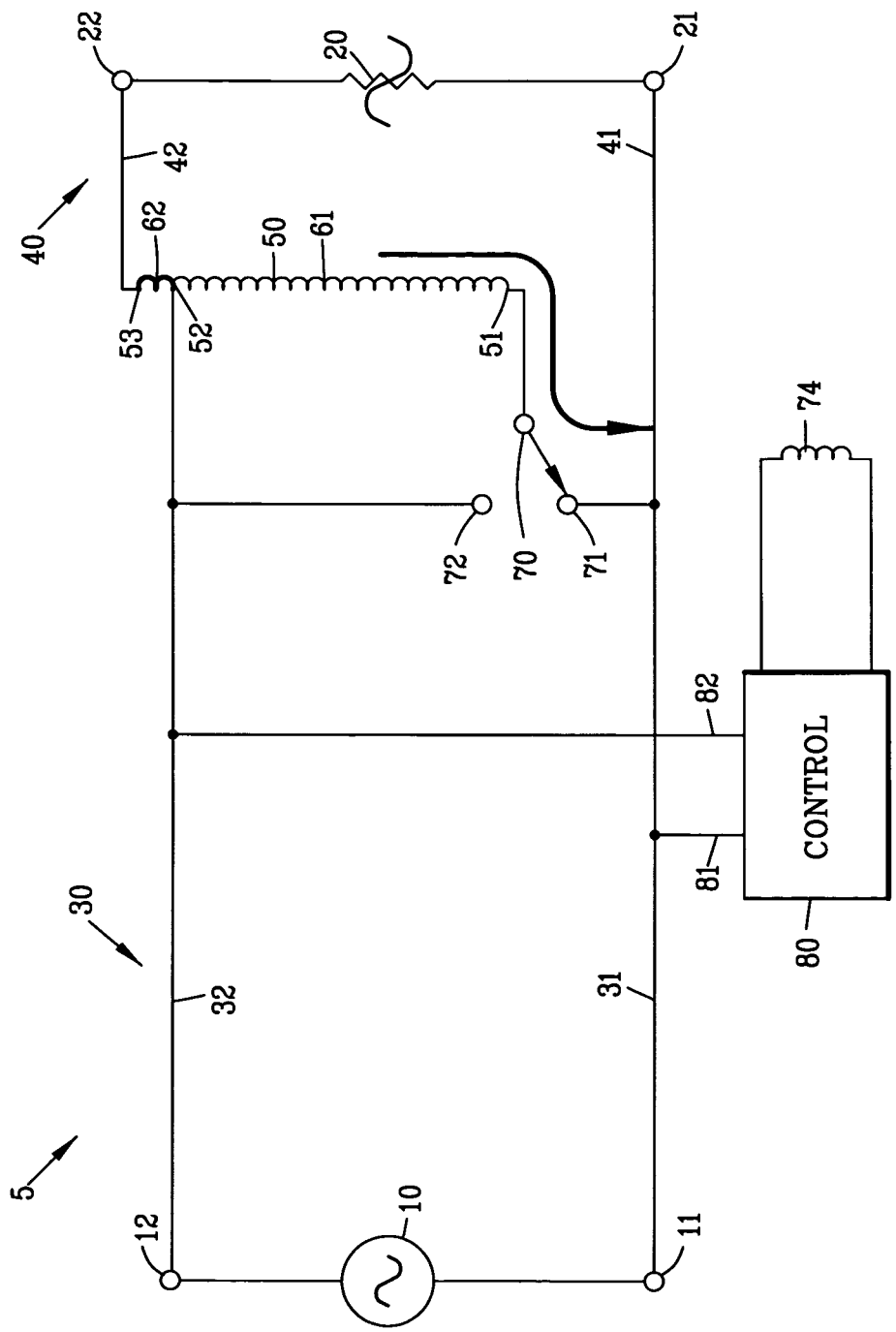
FIG. 4 is a circuit diagram of a first embodiment of a voltage compensation circuit with switches located in a first position for providing an elevated output AC voltage.

FIG. 4 is a circuit diagram of a first embodiment of a voltage compensation circuit 5 of the present invention. The input AC voltage source 10 defines a first and a second input terminal 11 and 12. The input cable 30 comprises a first and a second input connector 31 and 32 whereas the output cable 40 comprises a first and a second output connector 41 and 42 for interconnecting the voltage compensation circuit 5 between the AC voltage source 10 and the load 20.

The voltage compensation circuit 5 comprises an autotransformer 50 having a first, second and a third transformer tap 51-53. The second transformer tap 52 of the autotransformer 50 is located between the first and third transformer taps 51 and 53. A first transformer winding 61 is defined between the first transformer tap 51 and the second transformer tap 52 of the autotransformer 50. A second transformer winding 62 is defined between the second transformer tap 52 and the third transformer tap 53 of the autotransformer 50.

In this embodiment, the first autotransformer winding 61 has a greater number of windings than the second autotransformer winding 62. The second autotransformer winding 62 has a greater current carrying capacity than the first autotransformer winding 61.

The first input connector 31 and the first output connector 41 connect the first input terminal 11 to the first output terminal 21. The second input connector 32 connects the second input terminal 12 to the second autotransformer tap 52 of the autotransformer 50. The autotransformer output connector 42 connects the third transformer tap 53 of the autotransformer 50 to the second output terminal 22.

The voltage compensation circuit 5 comprises a switch 70 connected to the first transformer tap 51 of the autotransformer 50. The switch 70 has a first position 71 and a second position 72. The switch 70 comprises an electrically operated solenoid coil 74 for electrically moving the switch 70 between the first position 71 shown in FIG. 4 and the second position 72 shown in FIG. 5. In the alternative, the switch 70 may be a solid state relay switch.

A control 80 includes plural connectors 81 and 82 connected to the first and second input connectors 31 and 32 for monitoring the input AC voltage source 10. The control 80 controls the electrically operated solenoid coil 74 for operating the switch 70 between the first and second positions 71 and 72 in accordance with the input AC voltage between the first and second input terminals 11 and 12.

FIG. 4 illustrates the input AC voltage source 10 in an under voltage condition. The control 80 senses the under voltage condition of the input AC voltage source 10, and moves the switch 70 into the first position 71. The first position 71 of the switch 70 connects the first transformer winding 61 as a primary winding and the second transformer winding 62 as a secondary winding. The under voltage AC voltage source 10 applied to the first transformer winding 61 provides an elevated output AC voltage at the second transformer winding 62 across the first and second output terminals 21 and 22. The voltage compensation circuit 5 operates in an active mode to elevate the output AC voltage across the first and second output terminals 21 and 22.

The first autotransformer winding 61 has a greater number of windings than the second autotransformer winding 62. The total number of windings across the first and second output terminals 21 and 22 is the sum of the number of windings of the first autotransformer winding 61 plus the number of windings of the second autotransformer winding 62. Preferably, the first and second autotransformer windings 61 and 62 have a ratio proportional to a desired elevated output AC voltage at the first and second output terminals 21 and 22. In this example, the first autotransformer winding 61 is shown having twenty windings whereas the second autotransformer winding 62 is shown having two windings resulting in a ten percent elevation in voltage at the first and second output terminals 21 and 22 relative to the AC voltage at the first and second input terminals 11 and 12.

The voltage compensation circuit 5 incorporates an autotransformer 50 between the AC voltage source 10 and the load 20. All current flow from the AC voltage source 10 to the load 20 flows through the second autotransformer winding 62. The second autotransformer winding 62 has a greater winding cross-sectional area than the second autotransformer winding 62 to carry the current through the load 20. Preferably, the first and second autotransformer windings 61 and 62 have a ratio of cross-sectional area proportional to a ratio of the number of the first and the second autotransformer windings 61 and 62. In this example, the second autotransformer winding 62 has a cross-sectional area ten times the cross-sectional area of the first autotransformer winding 61.

Figure 5:
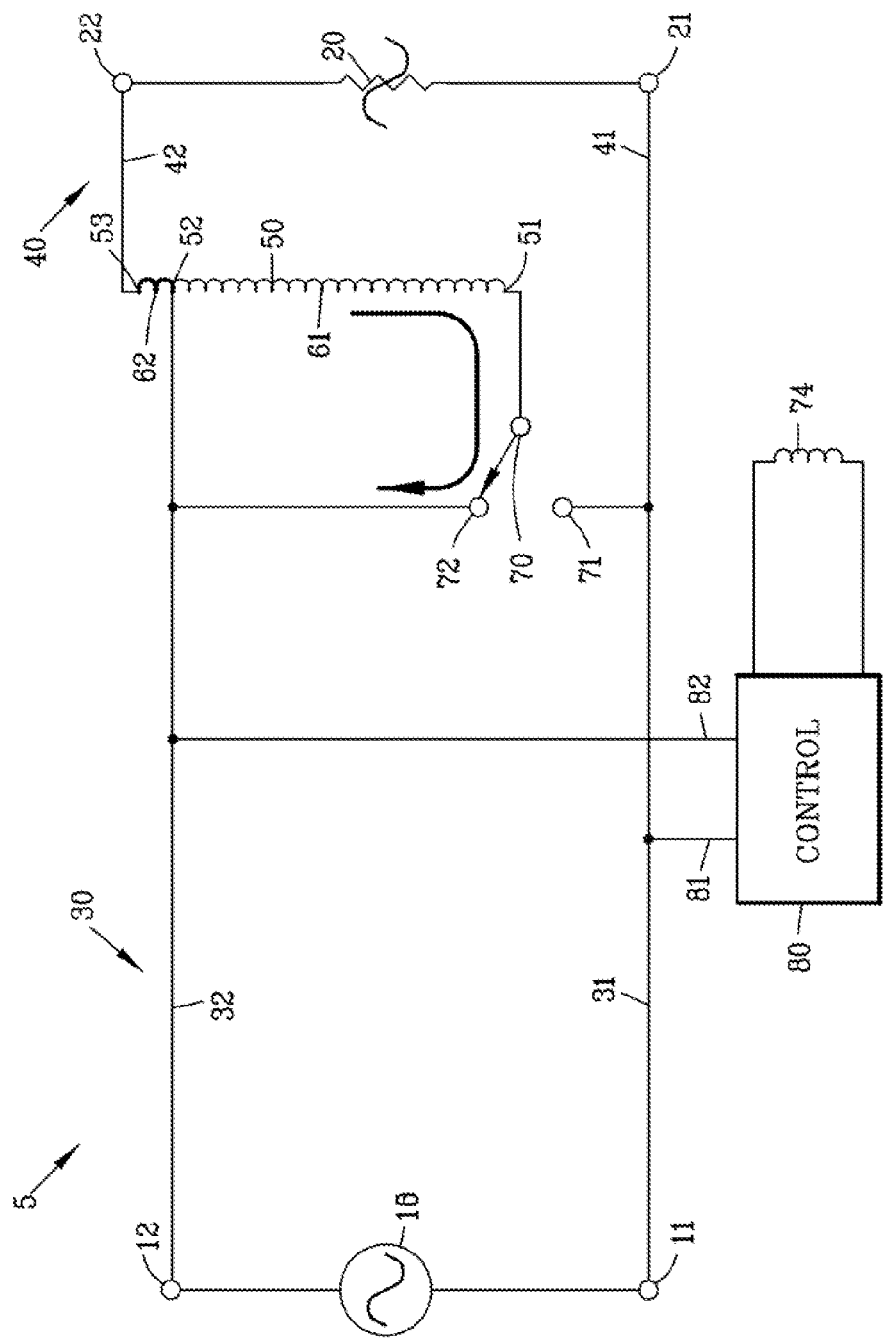
FIG. 5 is the circuit diagram of FIG. 4 with the switch located in a second position for providing a non-elevated output AC voltage.

FIG. 5 illustrates the input AC voltage source 10 in a normal voltage condition. The control 80 senses the normal voltage condition of the input AC voltage source 10, and moves the switch 70 into the second position 72. The second position 72 of the switch 70 connects the second transformer winding 62 as a primary winding and the first transformer winding 61 as a shorted secondary winding.

The second position 72 of the switch 70 shorts the first autotransformer winding 61 for providing a non-elevated output AC voltage across the first and second output terminals 21 and 22. The shorted first autotransformer winding 61 provides zero reflected impedance to the second autotransformer winding 62. The zero reflected impedance from the shorted first autotransformer winding 61 to the second autotransformer winding 62 makes the second autotransformer winding 62 acts as a non-inductive wire. The voltage compensation circuit 5 operates in a passive mode of operation to transfer the AC voltage from the first and second input terminals 11 and 12 to the first and second output terminals 21 and 22.

Figure 6:
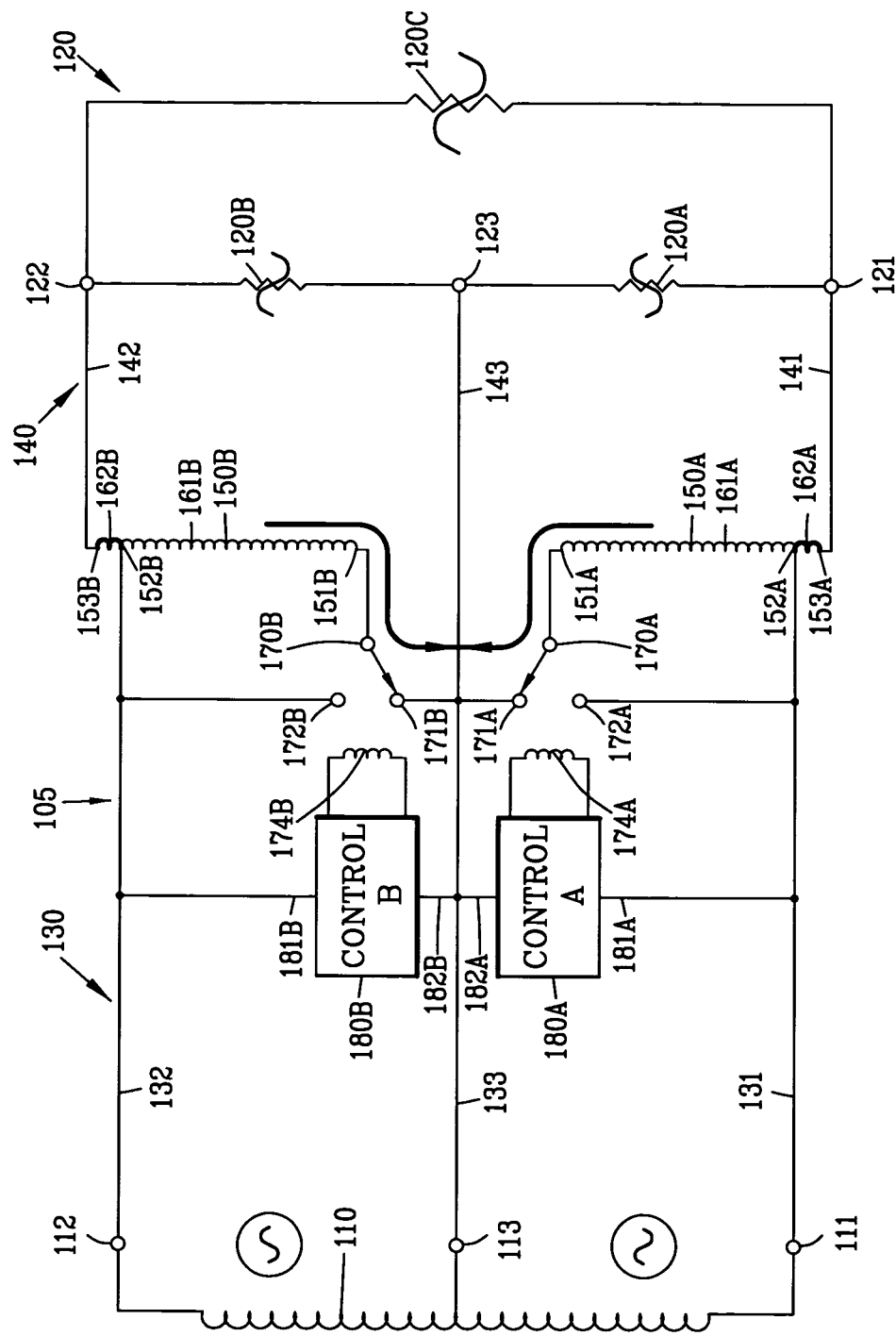
FIG. 6 is a circuit diagram of a second embodiment of a voltage compensation circuit with switches located in a first position for providing an elevated output AC voltage.

FIG. 6 is a circuit diagram of a second embodiment of a voltage compensation circuit 105 of the present invention. Similar parts are labeled with similar reference characters raised by 100. In this example, the AC voltage source 110 is shown as a conventional 240-volt alternating current source. Although the AC voltage source 110 is shown as a conventional 240-volt AC voltage source, it should be understood that the AC voltage source 110 maybe any type of AC voltage source including one phase of a three phase electrical system.

The input AC voltage source 110 defines a first and a second input terminal 111 and 112 with a third input terminal 113 shown as a neutral terminal. The input cable 130 comprises first through third input connectors 131-133 whereas the output cable 140 comprises first through third output connector 141-143 for interconnecting the voltage compensation circuit 105 between the AC voltage source 110 and the load 120. In this example, the load 120 comprises a first and a second 120-volt load 120A and 120B as well as a 240-volt load 120C.

The voltage compensation circuit 105 comprises a first and a second autotransformer 150A and 150B. The first and second autotransformers 150A and 150B are identical to one another and connected as mirror images of one another.

The first autotransformer 150A has a first, second and a third transformer tap 151A-153A. The second transformer tap 152A of the first autotransformer 150A is located between the first and third transformer taps 151A and 153A. A first transformer winding 161A is defined between the first transformer tap 151A and the second transformer tap 152A of the first autotransformer 150A. A second transformer winding 162A is defined between the second transformer tap 152A and the third transformer tap 153A of the first autotransformer 150A.

The second autotransformer 150B has a first, second and a third transformer tap 151B-153B. The second transformer tap 152B of the second autotransformer 150B is located between the first and third transformer taps 151B and 153B. A first transformer winding 161B is defined between the first transformer tap 151B and the second transformer tap 152B of the second autotransformer 150B. A second transformer winding 162B is defined between the second transformer tap 152B and the third transformer tap 153B of the second autotransformer 150B.

In this embodiment, the first autotransformer windings 161A and 161B have a greater number of windings than the second autotransformer windings 162A and 162B. The second autotransformer windings 162A and 162B have a greater current carrying capacity than the second autotransformer winding 162A and 162B.

The first input connector 131 connects the first input terminal 111 to the second autotransformer tap 152A of the first autotransformer 150A. The second input connector 132 connects the second input terminal 112 to the second autotransformer tap 152B of the second autotransformer 150B. The third input connector 133 connects the third input terminal 113 to the third output terminal 123.

Autotransformer output connectors 141 and 142 connect the third transformer taps 153A and 153B of the first and second autotransformers 150A and 150B to the first and second output terminals 121 and 122. The 240-volt load 120C is connected across the first and second output terminals 121 and 122. The first and second 120-volt loads 120A and 120B are connected between the first and second output terminals 121 and 122 and the third output terminal 123.

The voltage compensation circuit 105 comprises a first and a second switch 170A and 170B connected to the first transformer taps 151A and 151B of the first and a second autotransformer 150A and 150B. The switches 170A and 170B have first positions 171A and 171B and second positions 172A and 172B. The switches 170A and 170B are electrically operated by solenoid coils 174A and 174B for electrically moving the switches 170A and 170B between the first positions 171A and 171B shown in FIG. 6 and the second positions 172A and 172B shown in FIG. 7.

A first and a second control 180A and 180B are connected to the first and second solenoid coils 174A and 174B for controlling the first and second switches 170A and 170B. The connectors 181A and 182A are connected between the first and third input connectors 131 and 133 for monitoring phase one of the input AC voltage source 110. The connectors 181B and 182B are connected between the second and third input connectors 132 and 133 for monitoring phase two of the input AC voltage source 110.

FIG. 6 illustrates the input AC voltage source 110 in an under voltage condition. The controls 180A sense an under voltage condition of the input AC voltage source between the first and the third input terminals 111 and 113 and moves the switch 170A into the first position 171A. The under voltage AC voltage source between the first and third input terminal 111 and 113 applied to the first transformer winding 161A provides an elevated output AC voltage at the second transformer winding 162A across the first and third output terminals 121 and 123.

The controls 180B sense an under voltage condition of the input AC voltage source between the second and the third input terminals 112 and 113 and moves the switch 170B into the first position 171B. The under voltage AC voltage source between the second and third input terminal 112 and 113 applied to the first transformer winding 161B provides an elevated output AC voltage at the second transformer winding 162B across the second and third output terminals 122 and 123.

The independent controls 180A and 180B provide independent sensing and independent elevation of the output AC voltages across the first and third output terminals 121 and 123 and across the second and third output terminals 122 and 123.

Figure 7:
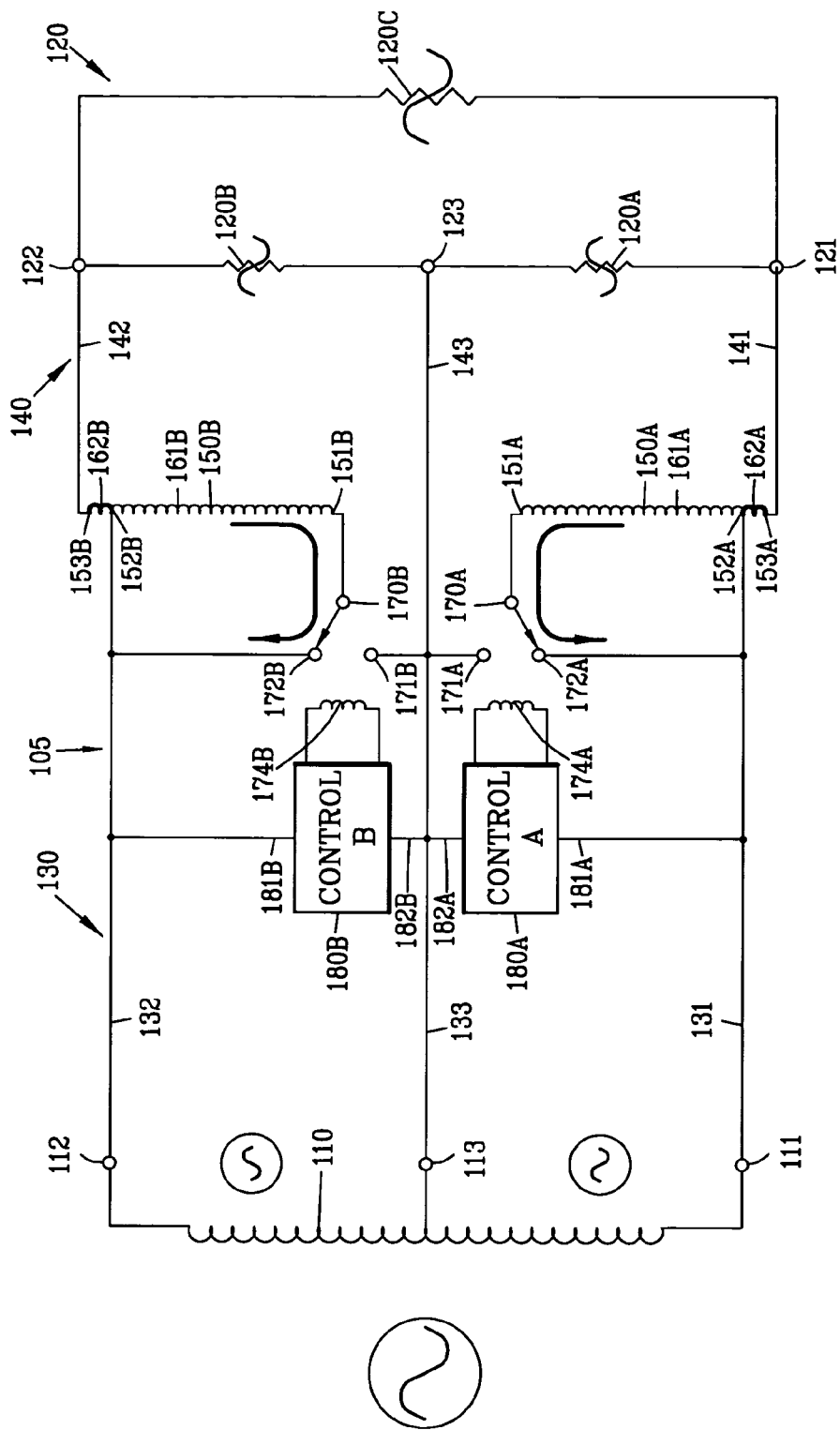
FIG. 7 is the circuit diagram of FIG. 6 with the switches located in a second position for providing a non-elevated output AC voltage.

FIG. 7 illustrates the input AC voltage source 110 in a normal voltage condition. The control 180A senses the normal voltage condition of the input AC voltage source 110 between the first and the third input terminal 111 and 113 and moves the switch 170A into the second position 172A. The second position 172A of the switch 170A shorts the first autotransformer winding 161A for providing a non-elevated output AC voltage across the first and third output terminals 121 and 123.

Similarly, the control 180B senses the normal voltage condition of the input AC voltage source 110 between the second and the third input terminal 112 and 113 and moves the switch 170B into the second position 172B. The second position 172B of the switch 170B shorts the first autotransformer winding 161B for providing a non-elevated output AC voltage across the second and third output terminals 122 and 123.

The second embodiment of the voltage compensation circuit 105 may be used for primarily regulating the voltage on the loads 120A and 120B and secondarily regulating the voltage on the load 120C. The voltage compensation circuit 105 individually regulates the voltage on the loads 120A and 120B and compensates for different power requirements on the loads 120A and 120B.

Figure 8:
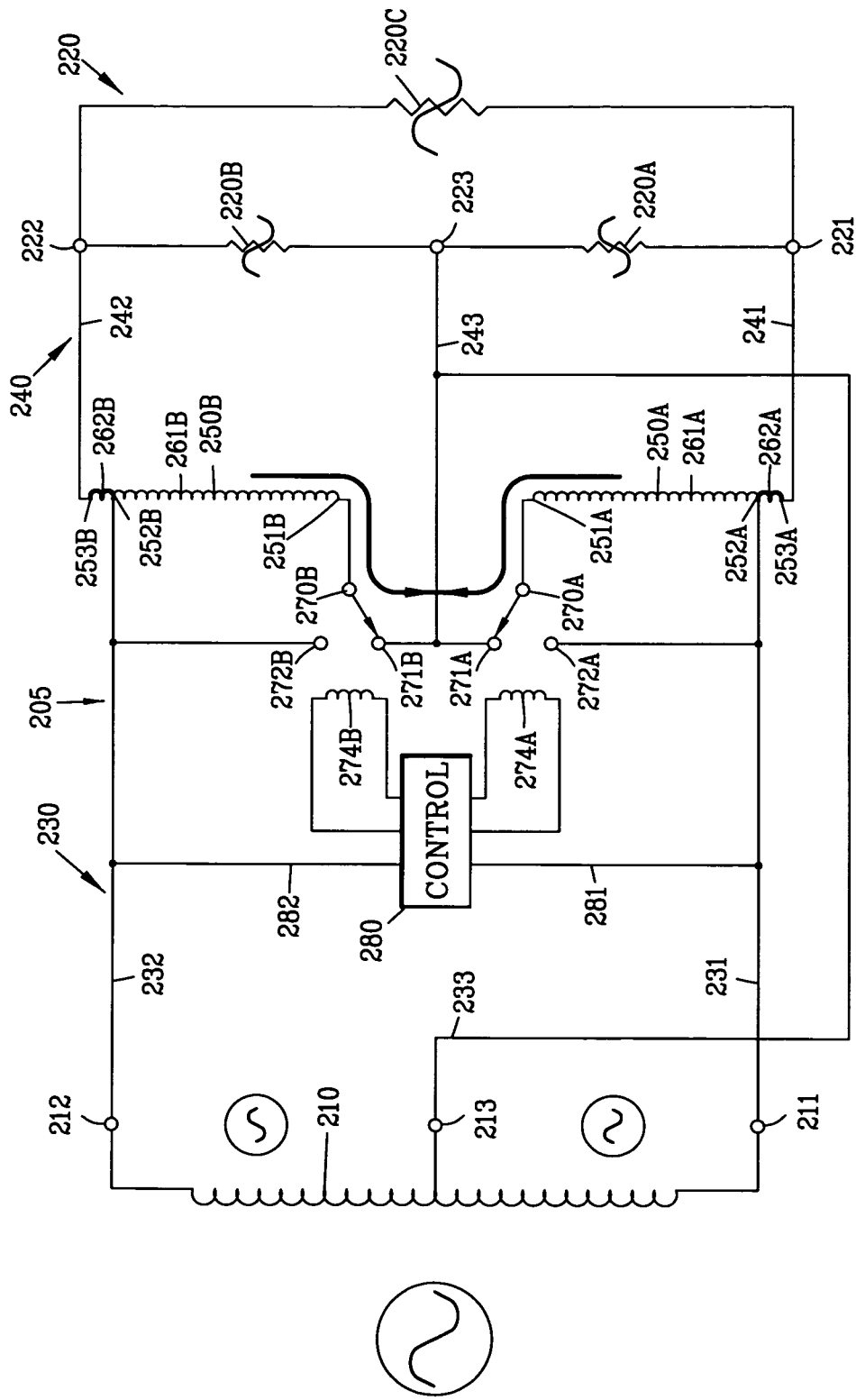
FIG. 8 is a circuit diagram of a third embodiment of a voltage compensation circuit with switches located in a first position for providing an elevated output AC voltage.

FIG. 8 is a circuit diagram of a third embodiment of a voltage compensation circuit 205 of the present invention. The third embodiment of the voltage compensation circuit 205 is a variation of the voltage compensation circuit 105 shown in FIGS. 6-7 with similar parts are labeled with similar reference characters raised by 100.

In this embodiment, the voltage compensation circuit 205 includes a single control 280. The control 280 senses an under voltage condition of the input AC voltage source between the first and the second terminals 211 and 212 and moves the switches 270A and 270B into the first positions 271A and 271B. The under voltage AC voltage source between the first and second terminals 211 and 213 applied to the first transformer windings 261A and 261B provide an elevated output AC voltage across the first and second output terminals 221 and 222.

Figure 9:
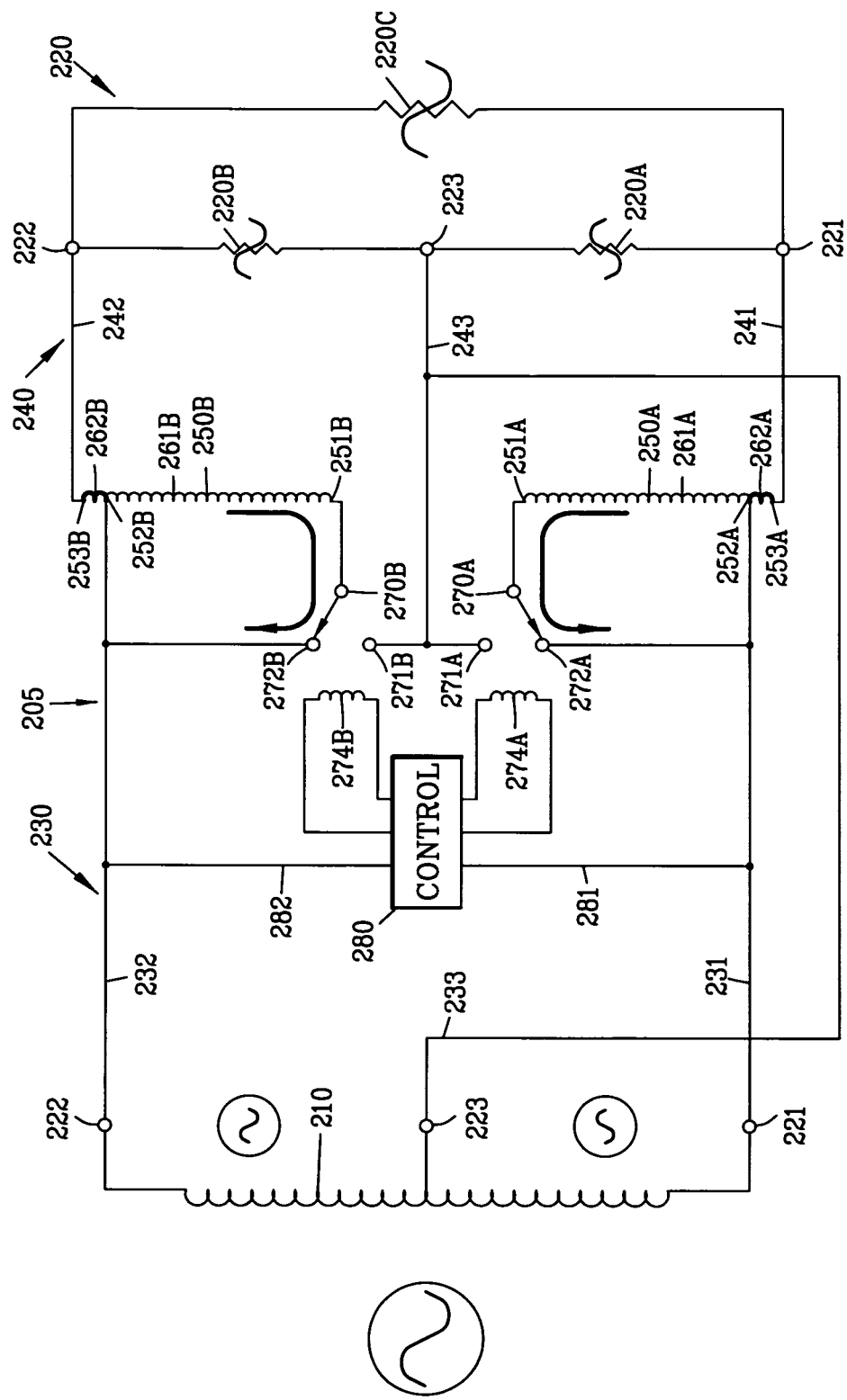
FIG. 9 is the circuit diagram of FIG. 8 with the switches located in a second position for providing a non-elevated output AC voltage.

FIG. 9 illustrates the input AC voltage source 210 in a normal voltage condition. The control 280 senses the normal voltage condition of the input AC voltage source 210 between the first and the second input terminals 221 and 222 and moves the switches 270A and 270B into the second positions 272A and 272B. The second positions 272A and 272B of the switches 270A and 270B short the first autotransformer windings 261A and 261B for providing a non-elevated output AC voltage across the first and second output terminals 221 and 222.

Preferably, the third embodiment of the voltage compensation circuit 205 is used for primarily regulating the voltage on the load 220C and secondarily for regulating the voltage on the loads 220A and 220B. The voltage compensation circuit 205 regulates the voltage on the loads 220A and 220B in accordance with the power requirement on the load 220C.

Figure 10:
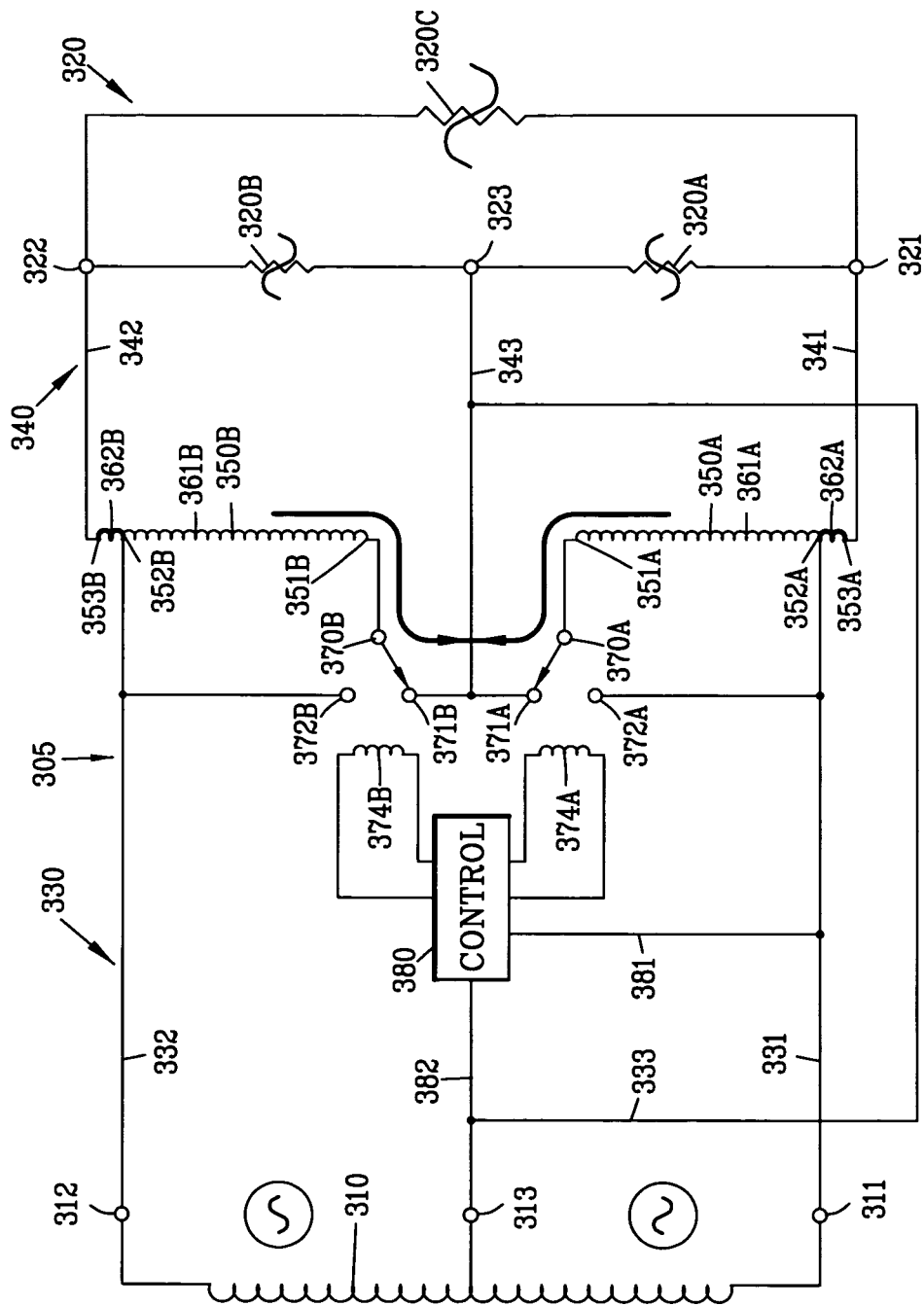
FIG. 10 is a circuit diagram of a fourth embodiment of a voltage compensation circuit with switches located in a first position for providing an elevated output AC voltage.

FIG. 10 is a circuit diagram of a fourth embodiment of a voltage compensation circuit 305 of the present invention. The fourth embodiment of the voltage compensation circuit 305 is a variation of the voltage compensation circuit 305 shown in FIGS. 8-9 with similar parts are labeled with similar reference characters raised by 100.

In this embodiment, the voltage compensation circuit 305 includes a single control 380. The control 380 sense an under voltage condition of the input AC voltage source between the first and the third terminals 311 and 313 and moves the switches 370A and 370B in unison into the first positions 371A and 371B. The under voltage AC voltage source between the first and third terminals 311 and 313 applied to the first transformer windings 361A and 361B provide an elevated output AC voltage across the first and second output terminals 321 and 322.

Figure 11:
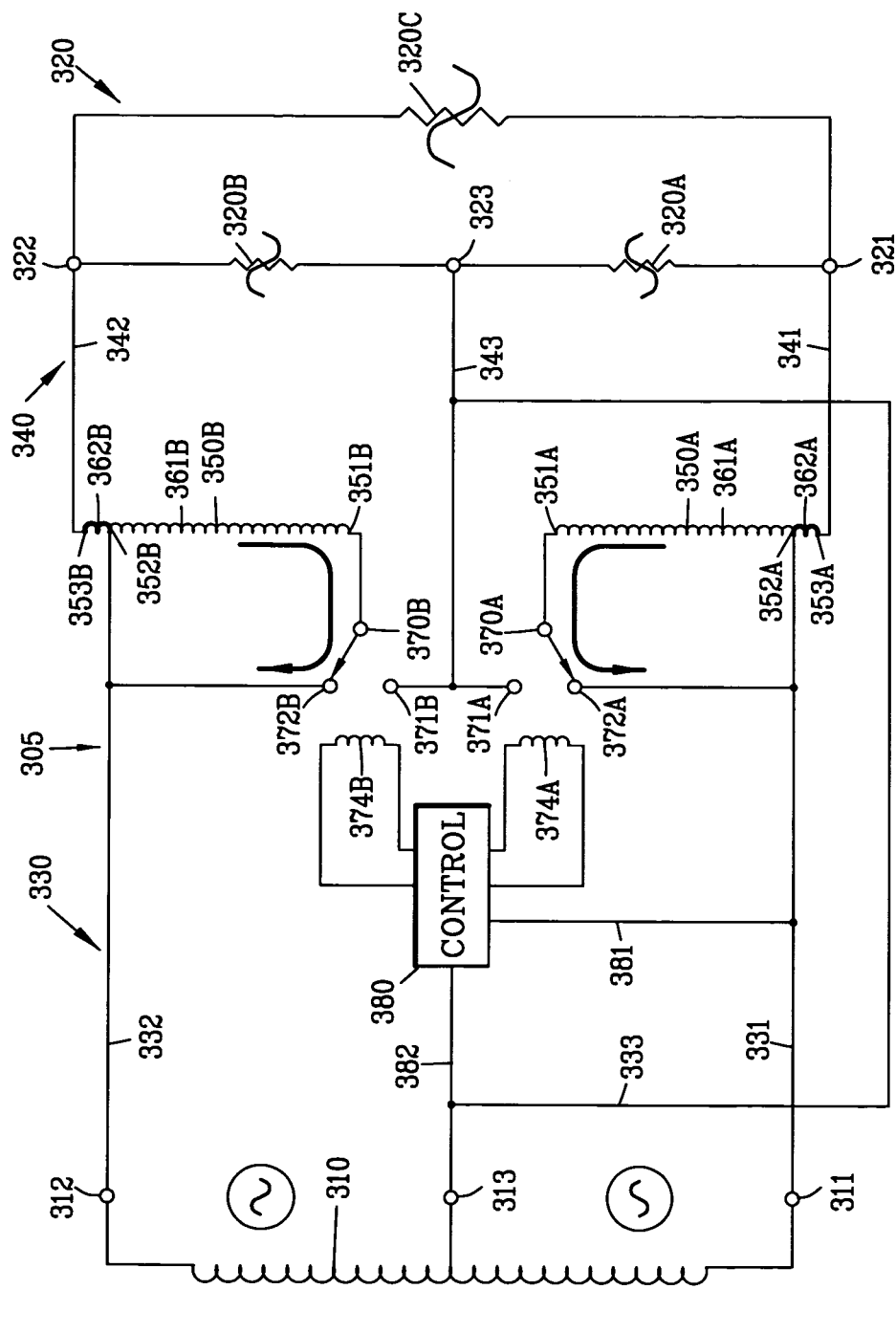
FIG. 11 is the circuit diagram of FIG. 10 with the switches located in a second position for providing a non-elevated output AC voltage.

FIG. 11 illustrates the input AC voltage source 310 in a normal voltage condition. The control 380 senses the normal voltage condition of the input AC voltage source 310 between the first and the third input terminals 311 and 313 and moves the switches 370A and 370B into the second positions 372A and 372B. The second positions 372A and 372B of the switches 370A and 370B short the first autotransformer windings 361A and 361B for providing a non-elevated output AC voltage across the first and second output terminals 321 and 323.

Preferably, the fourth embodiment of the voltage compensation circuit 305 is used for primarily regulating the voltage on the load 320C and secondarily for regulating the voltage on the loads 320A and 320B. The voltage compensation circuit 305 regulates the voltage on the loads 320A and 320B in accordance with the power requirement on the load 320C.

Figure 12:
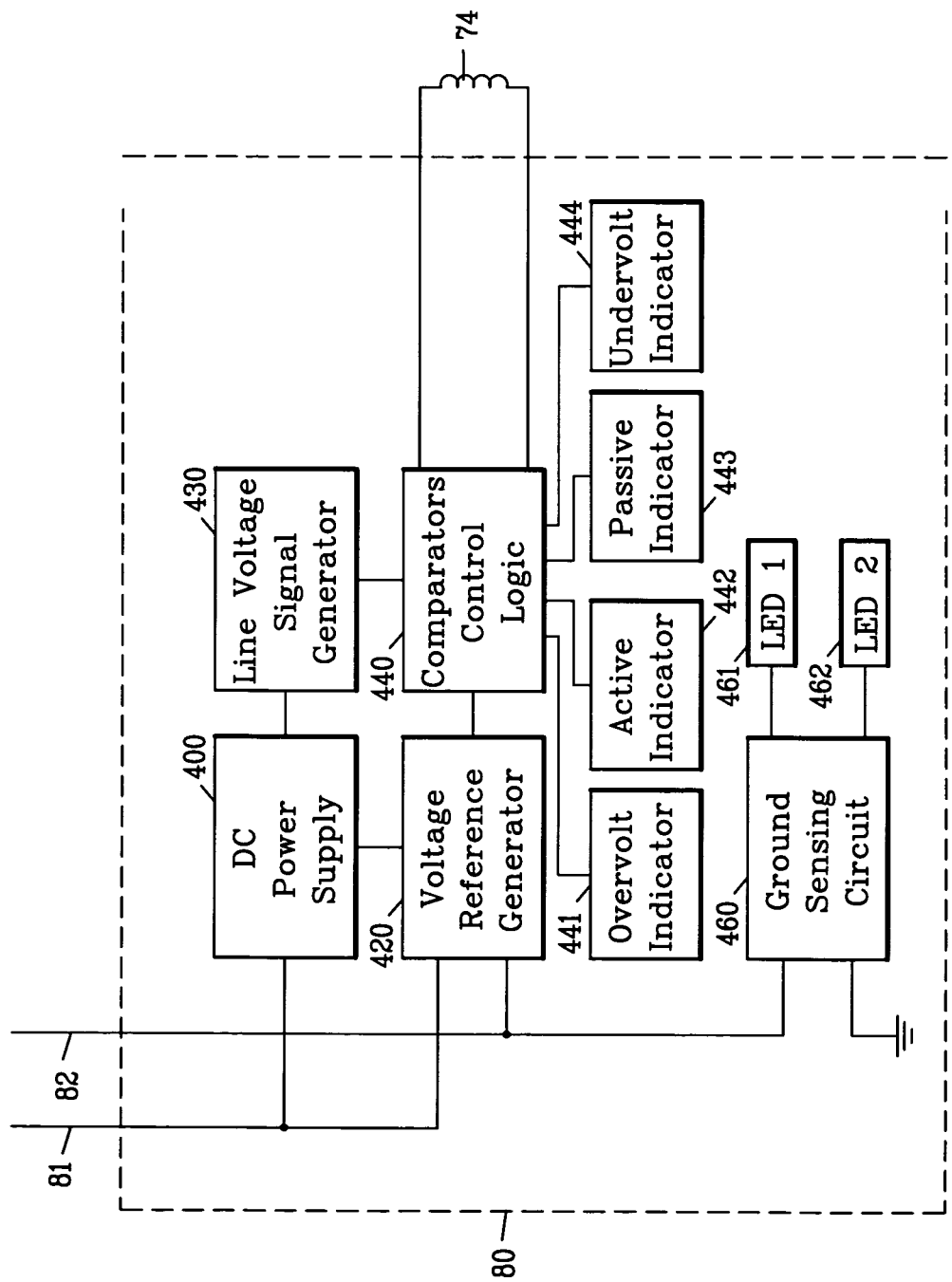
FIG. 12 a block diagram of the control portion of the voltage compensation circuit shown in FIGS. 4 and 5.

FIG. 12 is a block diagram of the control 80 of the voltage compensation circuit 5 shown in FIGS. 4 and 5. The control 80 comprises a DC power supply 400 for converting the AC voltage present between the first and second control connectors 81 and 82 for a suitable DC voltage for powering the control 80. A voltage reference generator 420 generates a voltage related to a normal AC line voltage. A line voltage generator 430 generates a signal representative of the actual input AC voltage 10. A comparator 440 compares the output of the voltage reference generator 420 and the line voltage generator 430. The comparator 440 controls the output to the solenoid coil 74 for operating the switch 70 shown in FIGS. 4 and 5. The comparator 440 provides an over voltage indicator 441, an active (voltage increase) indicator 442, a passive (no voltage increase) indicator 443 and an under voltage indicator 444 for indicating the status of the voltage compensation circuit 5.

The control 80 may include an optional ground sensing circuit 460 for sensing a proper grounding of the input AC voltage 10 of FIGS. 4 and 5. The ground sensing circuit 460 includes two indicators 461 and 462 for indicating the status of the ground sensing circuit 460.

Figure 13:
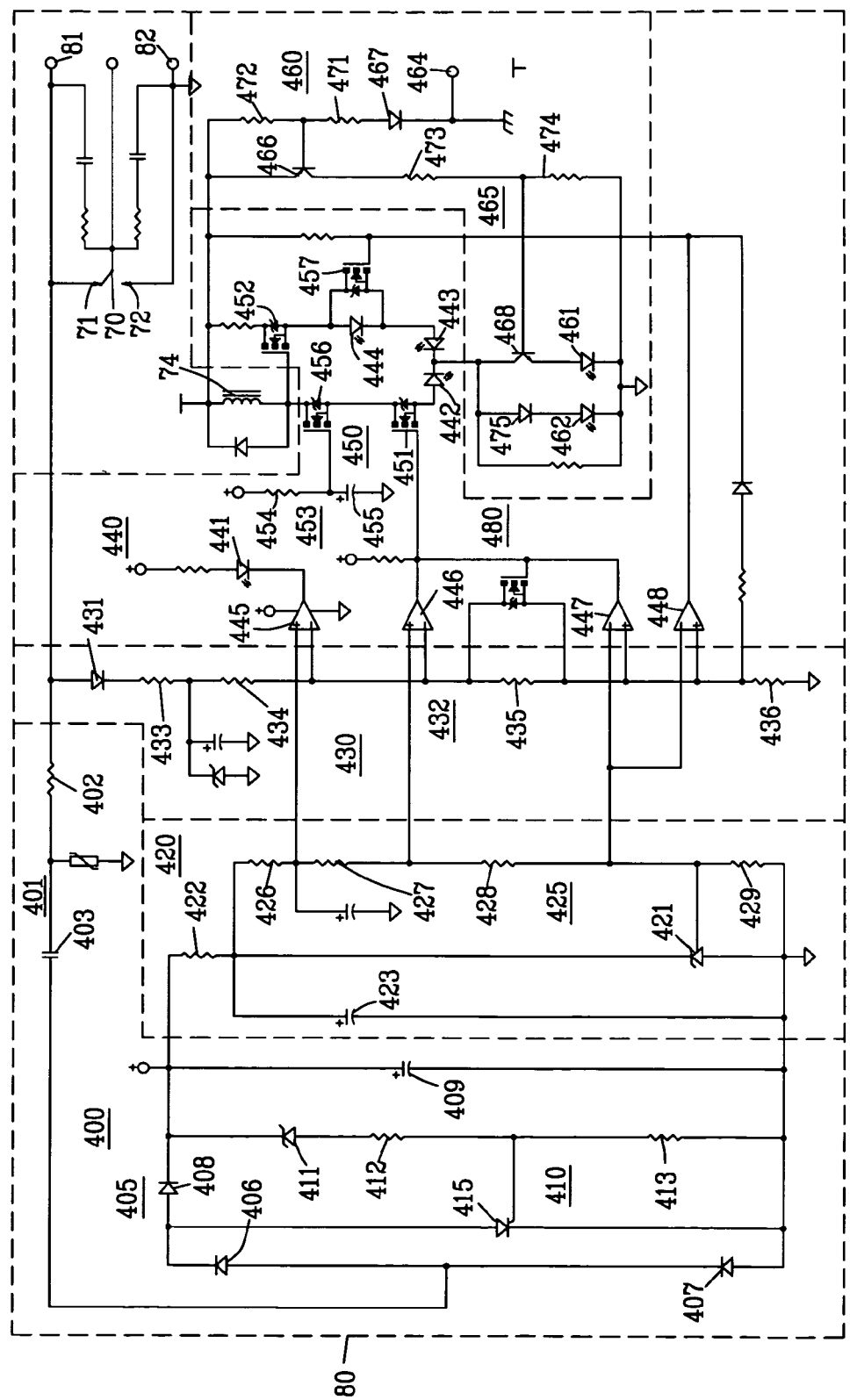
FIG. 13 is an example of a circuit suitable for use as the control of the voltage compensation circuit shown in FIG. 12.

FIG. 13 is a circuit diagram of one example of a circuit suitable as the control 80 for the voltage compensation circuit 5 shown in FIG. 12. The first and second control connectors 81 and 82 provide power to the control 80. The power supply 400 comprises a capacitive input supply 401 comprising resistor 402 and capacitor 403. The capacitive input supply 401 provides impedance for limiting the current flow to a rectifier circuit 405. The rectifier circuit 405 includes diodes 406-408 in combination with filter capacitor 409. The rectifier circuit 405 provides a positive DC voltage relative to neutral.

A regulator circuit 410 comprises a zener diode 411 in series with resistors 412 and 413 for providing an input to a thyristor 415. When the voltage across zener diode 411 exceeds a predetermined level, the thyristor 415 conducts to reduce the voltage across filter capacitor 409. The regulator circuit 410 maintains a constant predetermined voltage across filter capacitor 409. The regulated DC voltage from the power supply 400 is applied to a voltage reference generator 420.

The voltage reference generator 420 includes a programmable reference 421 in series with a resistor 422. The resistor 422 and a capacitor 423 reduce any remaining ripple from the power supply 400. A voltage divider 425 is located in parallel with the programmable reference 421 and the capacitor 423. The voltage divider 425 comprises resistors 426-428. The voltage across resistor 428 of the voltage divider 425 determines the breakdown voltage of the programmable reference 421. The programmable reference 421 maintains a constant predetermined voltage across voltage divider 425 and establishes reference voltages at the resistors 426-429 of the voltage divider circuit 425. The reference voltages present at the resistors 426-429 of the voltage divider circuit 425 are applied to the comparator 440.

A line voltage generator 430 comprises diode 431 connected in series with a voltage divider 430. The voltage divider 432 includes resistors 433-436. The line voltage generator 430 provides a series of voltages present at the resistors 433-436 of the voltage divider 432 that are related to the actual voltage between the first and second control connectors 81 and 82. The series of voltages present at the resistors 433-436 of the voltage divider 432 are applied to the comparator 440.

The comparator 440 drives the over under voltage indicator 441, the active indicator 442, the passive indicator 443 and the under voltage indicator 444 shown in FIG. 12. The comparator 440 comprises comparators 445-448.

Comparator 445 compares the reference voltage from resistor 426 to the line voltage present at the resistor 434. A line voltage present at the resistor 434 above the reference voltage from resistor 426 is indicative of an over voltage condition between the first and second control connectors 81 and 82. In the event of an over voltage condition between the first and second control connectors 81 and 82, the comparator 445 illuminates the over voltage indicator 441.

Comparator 446 compares the reference voltage from the resistor 427 to the line voltage present at the resistor 435. A line voltage present at the resistor 435 below the reference voltage from resistor 427 is indicative of a low voltage condition between the first and second control connectors 81 and 82. In the event of a low voltage condition between the first and second control connectors 81 and 82, the comparator 446 actuates a coil driver circuit 450 comprising transistor 451 to place the voltage compensation circuit 5 into an active mode of operation for elevating or boosting the voltage at the output terminals 21 and 22.

Conduction of transistor 451 provides current flow through coil 74 to move the switch 70 to the first position 71 as shown in FIG. 4 to elevate the voltage at the output terminals 21 and 22. The conduction of transistor 451 results in current flow through indicator 442 to visually indicate of the voltage compensation circuit 5 actively elevating or boosting the voltage at the output terminals 21 and 22.

When transistor 451 is not conducting, the voltage compensation circuit 5 is not actively elevating or boosting the voltage at the output terminals 21 and 22. Transistor 452 is configured to have reverse conducting properties from transistor 451. The conduction of the transistor 452 enables current flow through indicator 443 to visually indicate a passive mode of operation of the voltage compensation circuit 5 as shown in FIG. 5. Illumination of indicator 443 visually indicates the voltage compensation 5 is in a passive mode of operation and is not actively elevating or boosting the voltage at the output terminals 21 and 22.

An initializing circuit 453 comprises resistor 454, capacitor 455 and transistor 456. The initializing circuit 453 prevents operation of the coil 74 during initial startup until capacitor 455 is charged to a level sufficient to actuate transistor 456.

Comparator 447 compares the reference voltage from the resistor 428 to the line voltage present at the resistor 435. A line voltage present at the resistor 435 far below the reference voltage from resistor 427 is indicative of a major under voltage condition between the first and second control connectors 81 and 82. In the event of a major under voltage condition between the first and second control connectors 81 and 82, the comparator 447 terminates conduction of the coil driver circuit 450 by turning off transistor 451. Termination of conduction of transistor 451 terminates current flow through coil 74 to move the switch 70 to the second position 72 shown in FIG. 5. The termination of conduction of transistor 451 initiates conduction of transistor 452. The conduction of the transistor 452 enables current flow through indicator 443 to visually indicate a passive mode of operation of the voltage compensation circuit 5 as shown in FIG. 5.

Comparators 446 and 447 cooperate to function as a window comparator to permit the conduction of transistor 451 and current flow through coil 74 only within a permitted range of voltage. The comparators 446 and 447 inhibit conduction of transistor 451 and current flow through coil 74 above and below the permitted range of voltage. A hysteresis circuit 480 insures smooth transition during voltage transitions into and out of the permitted range of voltage.

Comparator 448 compares the reference voltage from the resistor 428 to the line voltage present at the resistor 436. A line voltage present at the resistor 436 far below the reference voltage from resistor 428 is indicative of a severe under voltage condition between the first and second control connectors 81 and 82. In the event of a severe under voltage condition between the first and second control connectors 81 and 82, the comparator 448 terminates conduction of transistor to illuminate the under voltage visual indicator 444. Typically, a severe under voltage condition is a condition whereat the voltage compensation circuit 5A is unable to compensate for the severe under voltage condition.

An optional ground sensing circuit 460 may be included within the control 80 for testing for the proper grounding in a 120-volt electrical power source 10 having a phase line and a neutral line. The optional ground sensing circuit 460 includes the indicators 461 and 462 shown in FIG. 12 to provide a visual indication of any connection errors in the electrical power source 10.

The optional ground sensing circuit 460 tests for an erroneous interchange of the phase and neutral terminals of the electrical power source 10 at the pedestal 15 shown in FIG. 1. The ground sensing circuit 460 includes a ground test terminal 464 connected in a ground detection circuit 465 comprising transistor 466, diode 467 and resistors 471-474. The ground detection circuit 465 insures the neutral line and the ground 475 and the neutral line 476 are connected to each other.

In the event the ground test terminal 464 is properly connected to a neutral line, the ground detection circuit 465 will conduct current through transistor 466, diode 467 and resistors 471-474. The conduction of the ground detection circuit 465 will actuate transistor 468 to illuminate LED 461 indicating the ground is connected to neutral line. During conduction of the transistor 468, the forward bias voltage of diode 475 prevents illumination of LED 462.

In the event the ground test terminal 464 is not connected to the neutral line, the ground detection circuit 465 will not conduct and transistor 468 will not be actuated. The non-conduction state of transistor 468 permits illumination of LED 462. In the event the phase and neutral are interchanged, both LED 461 and LED 462 are illuminated to indicate this error.

Figure 14:
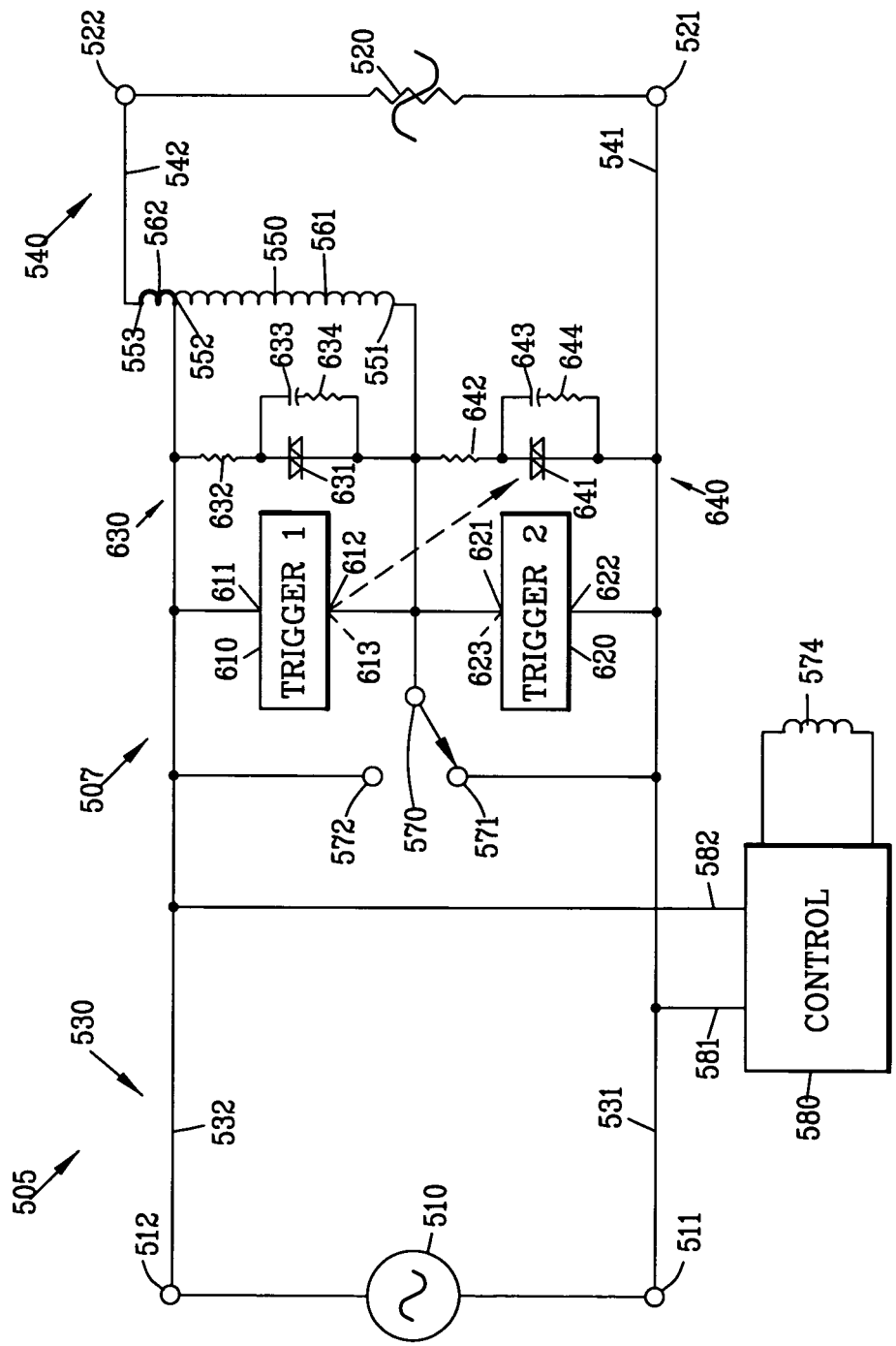
FIG. 14 is a circuit diagram of a fifth embodiment of a voltage compensation circuit incorporating an arc suppression circuit with switches located in a first position for providing an elevated output AC voltage.

FIG. 14 is a circuit diagram of a fifth embodiment of a voltage compensation circuit 505 of the present invention. The voltage compensation circuit 505 is similar to the voltage compensation circuit 5 of FIG. 4 with the addition of an arc suppression circuit 507.

A first and a second input terminal 511 and 512 of the input AC voltage source 510 are connected to first and second input connectors 531 and 532 of the voltage compensation circuit 505. A first and a second output connector 541 and 542 interconnect the voltage compensation circuit 505 to the load 520. The voltage compensation circuit 505 comprises an autotransformer 550 having a first, second and a third transformer tap 551-553 defining a first transformer winding 561 a second transformer winding 562.

The first input connector 531 and the first output connector 541 connect the first input terminal 511 to the first output terminal 521. The second input connector 532 connects the second input terminal 512 to the second autotransformer tap 552 of the autotransformer 550. The autotransformer output connector 542 connects the third transformer tap 553 of the autotransformer 550 to the second output terminal 522.

The voltage compensation circuit 505 comprises a switch 570 connected to the first transformer tap 551 of the autotransformer 550. The switch 570 has a first position 571 and a second position 572. An electrically operated solenoid coil 574 moves the switch 570 between the first position 571 shown in FIG. 14 and the second position 572 shown in FIG. 15. In the alternative, the switch 570 may be a solid state relay switch.

A control 580 includes plural connectors 581 and 582 connected to the first and second input connectors 531 and 532 for monitoring the input AC voltage source 510. The control 580 controls the electrically operated solenoid coil 574 for operating the switch 570 between the first and second positions 571 and 572 in accordance with the input AC voltage between the first and second input terminals 511 and 512.

FIG. 14 illustrates the input AC voltage source 510 in an under voltage condition. The control 580 senses the under voltage condition of the input AC voltage source 510, and moves the switch 570 into the first position 571. The first position 571 of the switch 570 connects the first transformer winding 561 as a primary winding and the second transformer winding 562 as a secondary winding. The under voltage AC voltage source 510 applied to the first transformer winding 561 provides an elevated output AC voltage at the second transformer winding 562 across the first and second output terminals 521 and 522 as previously described with reference to FIG. 4.

Figure 15:
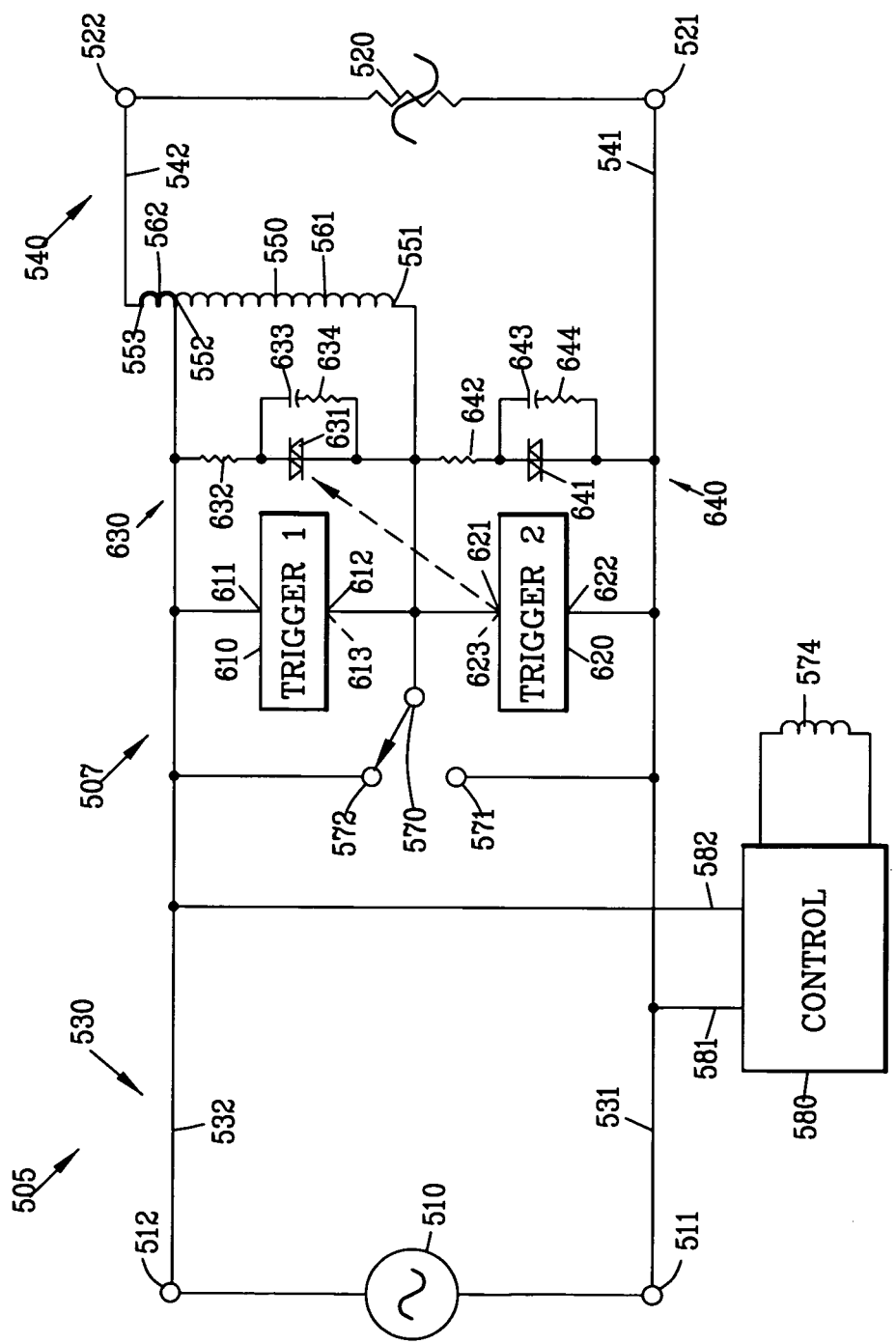
FIG. 15 is the circuit diagram of FIG. 14 with the switch located in a second position for providing a non-elevated output AC voltage.

FIG. 15 illustrates the input AC voltage source 510 in a normal voltage condition. The control 580 senses the normal voltage condition of the input AC voltage source 510, and moves the switch 570 into the second position 572. The second position 572 of the switch 570 connects the second transformer winding 562 as a primary winding and the first transformer winding 561 as a shorted secondary winding. The second position 572 of the switch 570 shorts the first autotransformer winding 561 for providing a non-elevated output AC voltage across the first and second output terminals 521 and 522 as previously described with reference to FIG. 5.

In many instances, an arc develops across the contacts of the switch 570 as the switch is moved between the first and second positions 571 and 572 as shown in FIGS. 14 and 15. An arc can cause catastrophic damage to the switch 570 if the arc is not extinguished promptly. An un-extinguished arc essentially establishes a low impedance plasma path between the first and second input terminals 511 and 512 of the AC voltage Source 510 producing essentially unlimited current and irreversible damage to the circuit. The arc suppression circuit 507 of the present invention prevents an arc from developing across the contacts of the switch 570 as the switch is moved between the first and second positions 571 and 572 as shown in FIGS. 1 and 15.

The arc suppression circuit 507 comprises a first and a second trigger circuit 610 and 620 coupled to a second and a first shunt circuit 640 and 630, respectively. In this example, the first and second trigger circuits 610 and 620 are coupled to the second shunt circuit 640 and first shunt circuit 630 through optical couplings.

The second trigger circuit 620 comprises an input 621 and an output 622 for energizing a second photoemitting device 623. The first shunt circuit 630 comprises a first shunt switch 631 connected in series with a current limiting resistor 632. A capacitor 633 and a resistor 634 are connected across first shunt switch 631 for suppressing transient signals. In this example the first shunt switch 631 is a photosensitive switch optically coupled to the second photoemitting device 623 of the second trigger circuit 620. The first shunt switch 631 is connected across the switch contacts when the switch 570 is located in the second position 572 as shown in FIG. 14.

The first trigger circuit 610 comprises an input 611 and an output 612 for energizing a first photoemitting device 613. The second shunt circuit 640 comprises a second shunt switch 641 connected in series with a current limiting resistor 642. A capacitor 643 and a resistor 644 are connected across second shunt switch 641 for suppressing transient signals. In this example the second shunt switch 641 is a photosensitive switch optically coupled to the first photoemitting device 613 of the first trigger circuit 610. The second shunt switch 641 is connected across the switch contacts when the switch 570 is located in the first position 571 as shown in FIG. 15.

FIG. 14 illustrates the input AC voltage source 510 in an under voltage condition with the switch 570 in the first position 571. In the first position 571, the first trigger circuit 610 is enabled since the AC voltage source 510 is applied between the input 611 and the output 612 through switch 570. The enabling of the first trigger circuit 610 actuates the photoemitting device 613 to enable the second shunt switch 641 as indicated by the arrow. The second shunt switch 641 does not conduct since the position of switch 570 provides zero voltage across the second shunt switch 641.

In the event the control 580 moves the switch 570 from the first position 571 to the second position 572 as shown in FIG. 15, the initial opening of switch 570 from the first position 571 raises the voltage across the second shunt switch 641 enabling the second shunt switch 641 to shunt any arcing current from the contacts of switch 570 as the switch 570 moves from the first position 571 to the second position 572. A more detailed explanation of the timing of the conduction of second shunt switch 641 may be found with reference to FIG. 16.

FIG. 15 is the circuit diagram of FIG. 14 with the switch 570 located in a second position 572 for providing a non-elevated output AC voltage to the load 520. In the second position 572, the second trigger circuit 620 is enabled since the AC voltage source 510 is applied between the input 621 and the output 622 through switch 570. The enabling of the second trigger circuit 620 actuates the photoemitting device 623 to enable the first shunt switch 631 as indicated by the arrow. The first shunt switch 631 does not conduct since the position of switch 570 provides zero voltage across the first shunt switch 631.

In the event the control 580 moves the switch 570 from the second position 572 to the first position 571 as shown in FIG. 14, the initial opening of switch 570 from the second position 572 raises the voltage across the first shunt switch 631 enabling the first shunt switch 631 to shunt any arcing current from the contacts of switch 570 as the switch 570 moves from the second position 572 to the first position 571. A more detailed explanation of the timing of the conduction of first shunt switch 631 may be found with reference to FIG. 17.

Figure 16:
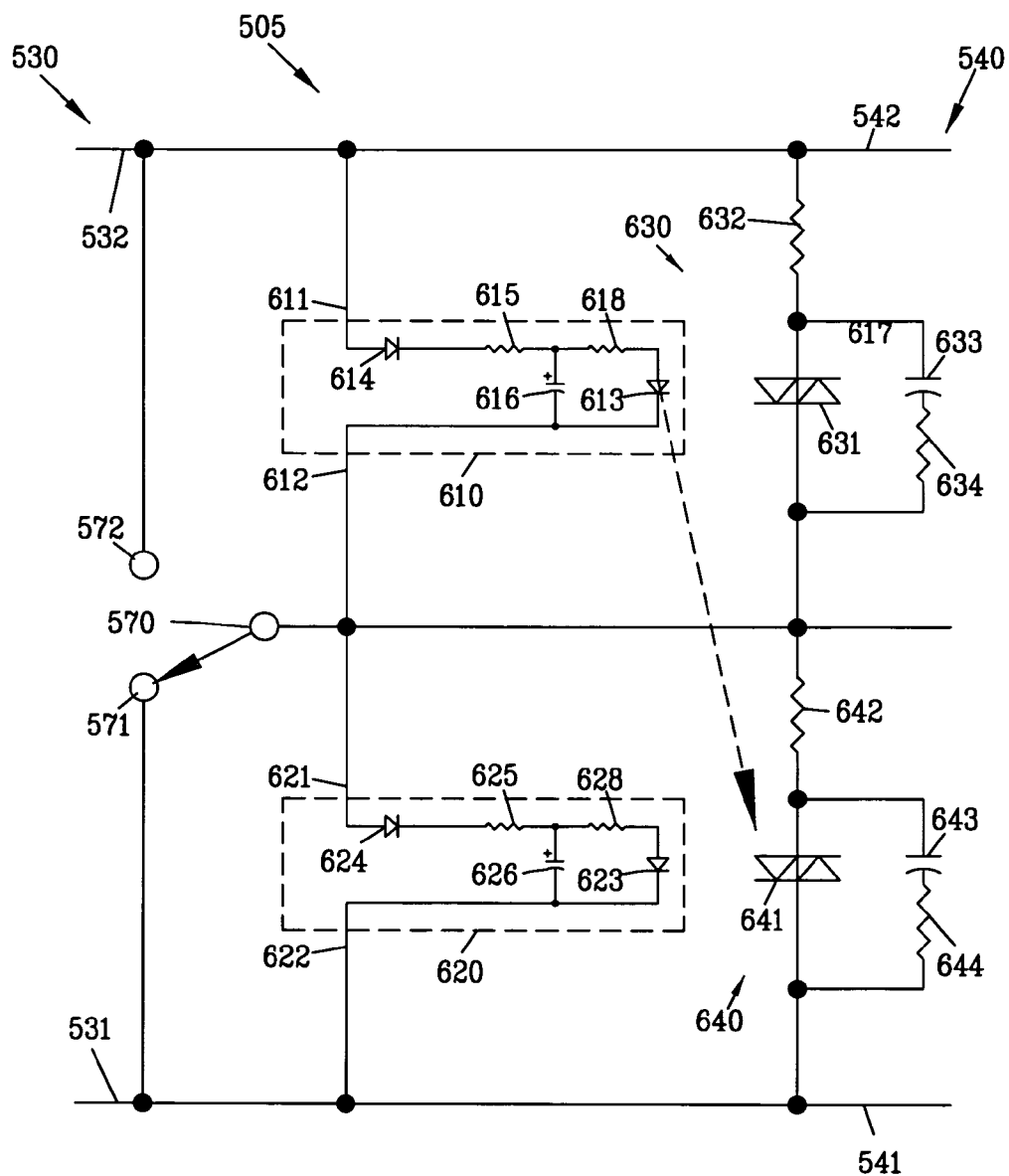
FIG. 16 is a more detailed circuit diagram of the arc suppression circuit of FIG. 14.

FIG. 16 is a more detailed circuit diagram of the arc suppression circuit 507 of FIG. 14. The AC voltage applied across the input 611 and output 612 of the first trigger circuit 610 is rectified by a diode 614 to provide pulsating, half wave direct current. Resistor 615 and capacitor 616 filter the half wave direct current. In addition, the resistor 615 and capacitor 616 create a time delay on enable of the first trigger circuit 610. After the time delay, the capacitor 616 is charged sufficiently to operate the first photoemitting device 613. As previously explained, the second shunt switch 641 does not conduct current until the switch 570 is moved from the first position 571 to the second position 572.

When the switch 570 is moved from the first position 571 to the second position 572, the AC voltage is removed from the input 611 and output 612 of the first trigger circuit 610. The energy stored in capacitor 616 provides a delay that keeps the second shunt switch 641 operational for approximately one cycle (16 mS). During this delay time, the second shunt switch 641 conducts a shunt current to reduce arcing as switch 570 is moved from the first position 571 to the second position 572. The conduction of second shunt switch 641 is terminated at the end of the delay time.

Figure 17:
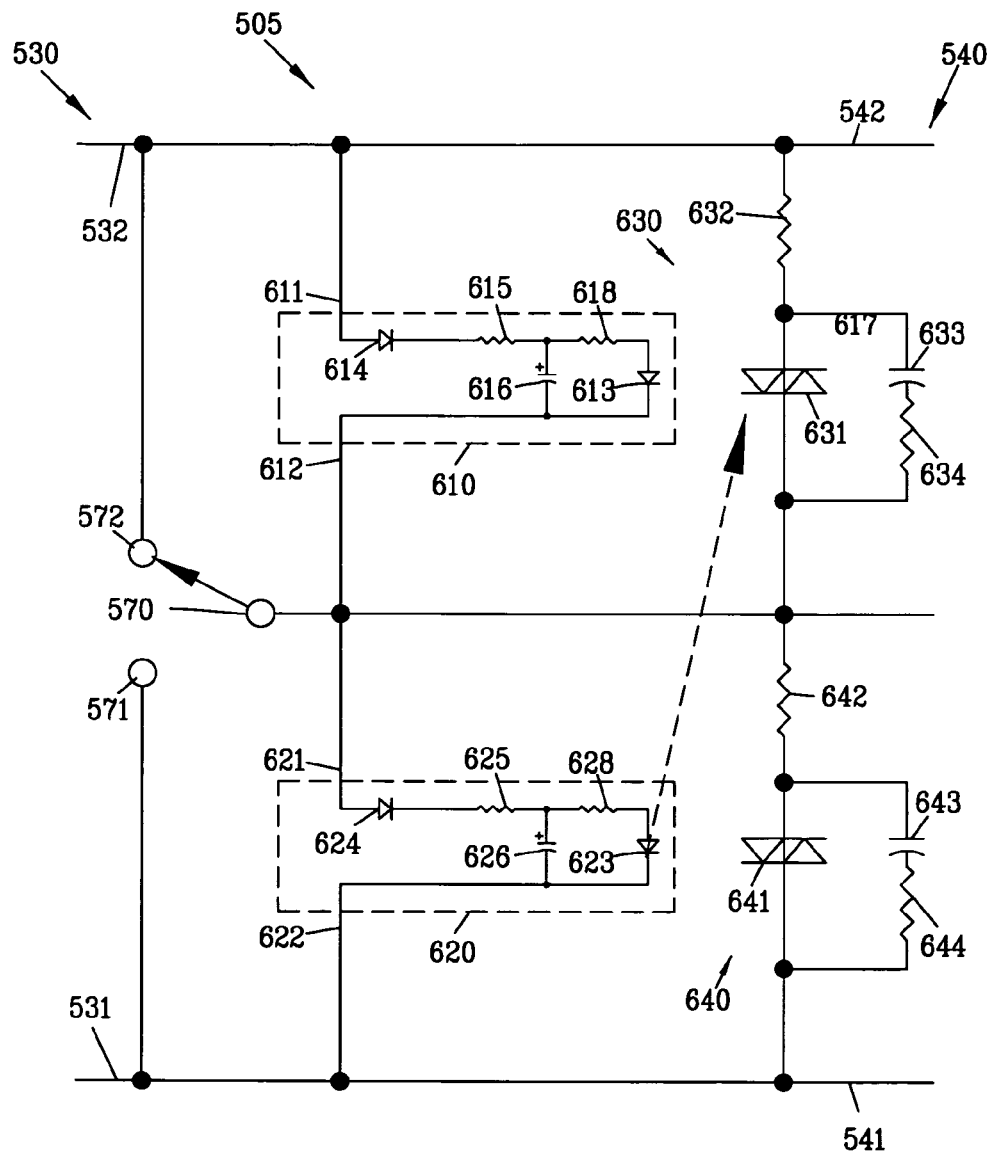
FIG. 17 is a more detailed circuit diagram of the arc suppression circuit of FIG. 15.

FIG. 17 is a more detailed circuit diagram of the arc suppression circuit 507 of FIG. 15. The AC voltage applied across the input 621 and output 622 of the second trigger circuit 620 is rectified by a diode 624 to provide pulsating, half wave direct current. Resistor 625 and capacitor 626 filter the half wave direct current. In addition, the resistor 625 and capacitor 626 create a time delay on enable of the second trigger circuit 620. After the time delay, the capacitor 626 is charged sufficiently to operate the second photoemitting device 623. As previously explained, the first shunt switch 631 does not conduct current until the switch 570 is moved from the second position 572 to the first position 571.

When the switch 570 is moved from the second position 572 to the first position 571, the AC voltage is removed from the input 621 and output 622 of the second trigger circuit 620. The energy stored in capacitor 626 provides a delay that keeps the first shunt switch 621 operational for approximately one cycle (16 mS). During this delay time, the first shunt switch 631 conducts a shunt current to reduce arcing as switch 570 is moved from the second position 572 to the first position 571. The conduction of first shunt switch 631 is terminated at the end of the delay time.

The arc suppression circuit 507 of the present invention provides substantial advancements for reducing arcing in switching contacts. Since the switching contacts carry the full load current during normal operation, there is no overheating of the shunt switches. Furthermore, the shunt switches only operate for a brief period of time during the movement of the switching contacts thus eliminating the need for heat sinks for the shunt switches. The inclusion of the arc suppression circuit enables the use of a smaller and lower cost switching contacts.

The voltage compensation circuit 5 continuously monitors line voltage conditions and uses a unique implementation of the autotransformer 50 to boost the incoming voltage to an acceptable level when low incoming line conditions exist. The Voltage compensation circuit 5 may be used on 50 A, 120/240 V single phase, 3-wire services or 120/208V, 3-wire network.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A voltage compensation circuit for receiving an input AC voltage at a first and a second input terminal and for providing an elevated output AC voltage at a first and a second output terminal in the event of an under voltage condition of the input AC voltage, comprising:

an autotransformer having a first, second and a third transformer tap with said second transformer tap located between said first and third transformer taps;

a first autotransformer winding defined between said first transformer tap and said second transformer tap of said autotransformer;

a second autotransformer winding defined between said second transformer tap and said third transformer tap of said autotransformer;

a first input connector connecting the first input terminal to the first output terminal;

a second input connector connecting the second input terminal to said second transformer tap of said autotransformer;

an autotransformer output connector connecting said third transformer tap of said autotransformer to the second output terminal;

a switch connected to said first transformer tap of said autotransformer;

a first position of said switch connecting said first transformer tap of said autotransformer to said first input connector to provide an elevated output AC voltage between the first and second output terminals; and a second position of said switch connecting said first transformer tap of said autotransformer to said second input connector for shorting said first autotransformer winding to provide a non-elevated output AC voltage between the first and second output terminal.

2. A voltage compensation circuit as set forth in claim 1, wherein said first position of said switch connects said first autotransformer winding as a primary winding and said second autotransformer winding as a secondary winding; and said second position of said switch connecting said second autotransformer winding as a primary winding and said first autotransformer winding as a shorted secondary winding.

3. A voltage compensation circuit as set forth in claim 1, wherein said first autotransformer winding has a greater number of windings than said second autotransformer winding.

4. A voltage compensation circuit as set forth in claim 1, wherein said first and second autotransformer windings have a ratio proportional to a desired elevated output AC voltage at the first and second output terminals.

5. A voltage compensation circuit as set forth in claim 1, wherein said second autotransformer winding has a greater winding thickness than said first autotransformer winding.

6. A voltage compensation circuit as set forth in claim 1, wherein said first and second autotransformer windings have a ratio of thickness generally proportional to a ratio of the number of said first and said second autotransformer windings.

7. A voltage compensation circuit as set forth in claim 1, wherein said switch comprises an electrically operated relay for electrically moving said switch between said first position and said second position.

8. A voltage compensation circuit as set forth in claim 1, including a control for operating said switch in accordance with the input AC voltage at the first and second input terminals.

9. A voltage compensation circuit as set forth in claim 1, including a control having a comparator for comparing the input AC voltage to a voltage reference; and said switch comprising an electrically operated relay for electrically moving said switch between said first position and said second position in accordance with an output from said comparator.

10. A voltage compensation circuit as set forth in claim 1, including a control having a ground sensing circuit for sensing a proper grounding of the input AC voltage.

11. A voltage compensation circuit for receiving an input AC voltage at a first and a second input terminal and for providing an elevated output AC voltage at a first and a second output terminal in the event of a reduction of the input AC voltage, comprising:

an autotransformer having a first, second and a third transformer tap with said second transformer tap located between said first and third transformer taps;

a first autotransformer winding defined between said first transformer tap and said second transformer tap of said autotransformer;

a second autotransformer winding defined between said second transformer tap and said third transformer tap of said autotransformer;

a first input connector connecting the first input terminal to the first output terminal of said autotransformer;

a second input connector connecting the second input terminal to said second transformer tap of said autotransformer;

an autotransformer output connector connecting said third transformer tap of said autotransformer to the second output terminal;

a switch connected to said first transformer tap of said autotransformer;

a first position of said switch connecting said first transformer tap of said autotransformer to said first input connector to provide an elevated output AC voltage between the first and second output terminals;

a second position of said switch connecting said first transformer tap of said autotransformer to said second input connector for shorting said first autotransformer winding to provide a non-elevated output AC voltage between the first and second output terminal; and said shorted first autotransformer winding providing a zero reflected impedance to said second autotransformer winding for providing a non-elevated output AC voltage at the first and second output terminal.

* * * * *